US012677305B2

(12) United States Patent
Park et al.

(10) Patent No.: US 12,677,305 B2
(45) Date of Patent: Jul. 7, 2026

(54) TIME GAPS FOR ARTIFICIAL INTELLIGENCE AND MACHINE LEARNING MODELS IN WIRELESS COMMUNICATION

(71) Applicant: QUALCOMM Incorporated, San Diego, CA (US)

(72) Inventors: Changhwan Park, San Diego, CA (US); Prashant Sharma, San Jose, CA (US); Taesang Yoo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 801 days.

(21) Appl. No.: 17/855,147

(22) Filed: Jun. 30, 2022

(65) Prior Publication Data

US 2024/0008067 A1     Jan. 4, 2024

(51) Int. Cl.
*H04L 41/16*          (2022.01)
*H04L 5/00*           (2006.01)
*H04W 72/50*          (2023.01)

(52) U.S. Cl.
CPC ......... *H04W 72/535* (2023.01); *H04L 5/0096* (2013.01); *H04L 41/16* (2013.01)

(58) Field of Classification Search
CPC ...... H04W 24/08; H04W 72/542; H04L 41/16
See application file for complete search history.

(56) References Cited

U.S. PATENT DOCUMENTS 11,930,525  B2 *  3/2024  Zhang ............... H04W 74/0833
2021/0314045  A1    10/2021  Cha et al.

2022/0217636  A1 *   7/2022  Shrivastava .......... H04W 72/23
2022/0394682  A1 *  12/2022  Nory ................. H04W 72/0453
2022/0400434  A1 *  12/2022  Seo .......................... H04L 5/001
2023/0006913  A1 *   1/2023  Lo ....................... H04L 41/0853
2023/0062393  A1 *   3/2023  Khan ..................... G06N 20/00
2025/0016744  A1 *   1/2025  Zhang ...................... H04L 5/14
(Continued)

FOREIGN PATENT DOCUMENTS

WO          2022015037 A1     1/2022

OTHER PUBLICATIONS

International Search Report and Written Opinion—PCT/US2023/024333—ISA/EPO—Sep. 26, 2023.
(Continued)

*Primary Examiner* — Romani Ohri
(74) *Attorney, Agent, or Firm* — Loza & Loza, LLP

(57)          ABSTRACT

Aspects of the present disclosure provide apparatuses and methods for providing time gaps that can be used for training, verifying, compiling, and/or switching artificial intelligence (AI)/machine learning (ML) models for use in wireless communication. In the time gaps, a wireless apparatus can deprioritize certain normally or routinely performed processes and functions to spare processing power and/or resources for performing AI/ML model related functions. In one example, an apparatus can provide one or more time gaps associated an AI/ML model used for communication with a network entity. The apparatus can deprioritize, in the one or more time gaps, at least one of uplink (UL) communication or downlink (DL) communication with the network entity. The apparatus can perform, in the one or more time gaps, one or more AI/ML model related processes.

23 Claims, 14 Drawing Sheets

(56) References Cited

U.S. PATENT DOCUMENTS

2025/0071540 A1* 2/2025 Wang ..................... H04W 8/22

OTHER PUBLICATIONS

Moderator (Qualcomm): "Summary of General Aspects of AI/ML Framework", 3GPP TSG RAN WG1 #109-e, R1-2205474, 3rd Generation Partnership Project, Mobile Competence Centre, 650, Route Des Lucioles, F-06921 Sophia-Antipolis Cedex, France, vol. RAN WG1, No. e-Meeting, May 9, 2022-May 20, 2022, May 18, 2022, XP052192104, 198 pages, section 2.3.1.

\* cited by examiner

1200

1202 Provide one or more time gaps associated with an AI/ML model used for communication with a network entity 1204 Deprioritize, in the one or more time gaps, at least one of UL communication or DL communication with the network entity 1206 Perform, in the one or more time gaps, one or more AI/ML models related processes

1402

Provide one or more time gaps to a UE, the one or more gaps being associated with an AI/ML model used at the UE in a RAN associated with the network entity

1404

Deprioritize, in the one or more time gaps, at least one of UL communication or DL communication with the UE

1406

Perform, in the one or more time gaps, one or more AI/ML models related processes

1400

TIME GAPS FOR ARTIFICIAL INTELLIGENCE AND MACHINE LEARNING MODELS IN WIRELESS COMMUNICATION

TECHNICAL FIELD

The technology discussed below relates generally to wireless communication systems, and more particularly, to time gaps for artificial intelligence and machine learning (AI/ML) model related functions in wireless communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. 5G NR systems can consume more power and achieve lower data rates than 4G systems.

Artificial intelligence (AI) can emulate human intelligence processes using machines, usually computer systems. Machine learning (ML) is a subset of AI that can create algorithms and statistical models to perform a specific task without using explicit instructions, relying instead on patterns and inference. In some aspects, replacing traditional wireless algorithms with AI and ML models may reduce power consumption and improve performance in wireless communication.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Aspects of the present disclosure provide apparatuses and methods for providing time gaps that can be used for training, verifying, compiling, and/or switching artificial intelligence (AI)/machine learning (ML) models for use in wireless communication. In the time gaps, a wireless apparatus can deprioritize certain normally or routinely performed processes and functions to spare processing power and/or resources for performing AI/ML model related functions.

One aspect of the disclosure provides a method of wireless communication at a user equipment (UE). The method includes providing one or more time gaps associated an artificial intelligence and machine learning (AI/ML) model used for communication with a network entity. The method further includes deprioritizing, in the one or more time gaps, at least one of uplink (UL) communication or downlink (DL) communication with the network entity. The method further includes performing, in the one or more time gaps, one or more AI/ML model related processes.

One aspect of the disclosure a user equipment (UE) for wireless communication. The UE includes a communication interface, a memory stored with executable code, and a processor coupled to the communication interface and the memory. The processor is configured by the executable code to provide one or more time gaps associated an artificial intelligence and machine learning (AI/ML) model used for communication with a network entity using the communication interface. The processor is further configured to deprioritize, in the one or more time gaps, at least one of uplink (UL) communication or downlink (DL) communication with the network entity. The processor is further configured to perform, in the one or more time gaps, one or more AI/ML model related processes.

One aspect of the disclosure a method of wireless communication at a network entity. The method includes providing one or more time gaps to a user equipment (UE), the one or more time gaps being associated with an artificial intelligence and machine learning (AI/ML) model at the UE in a radio access network associated with the network entity. The method further includes deprioritizing, in the one or more time gaps, at least one of uplink (UL) communication or DL communication with the UE. The method further includes performing, in the one or more time gaps, one or more AI/ML models related processes.

One aspect of the disclosure provides a network entity for wireless communication. The network entity includes a memory stored with executable code and a processor coupled to the memory. The processor is configured by the executable code to provide one or more time gaps to a user equipment (UE), the one or more time gaps being associated with an artificial intelligence and machine learning (AI/ML) model at the UE in a radio access network associated with the network entity. The processor is further configured to deprioritize, in the one or more time gaps, at least one of uplink (UL) communication or downlink (DL) communication with the UE. The processor is further configured to perform, in the one or more time gaps, one or more AI/ML models related processes.

These and other aspects of the invention will become more fully understood upon a review of the detailed description, which follows. Other aspects, features, and implementations will become apparent to those of ordinary skill in the art, upon reviewing the following description of specific, exemplary implementations in conjunction with the accompanying figures. While features may be discussed relative to certain examples and figures below, all implementations can include one or more of the advantageous features discussed herein. In other words, while one or more implementations may be discussed as having certain advantageous features, one or more of such features may also be used in accordance with the various examples discussed herein. In a similar fashion, while examples may be discussed below as device, system, or method implementations, it should be understood that such examples can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chips and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and UE), end-user devices, etc. of varying sizes, shapes and constitution.

Aspects of the disclosure provide various apparatuses and methods for providing time gaps used for training, verifying, compiling, and/or switching artificial intelligence (AI)/machine learning (ML) models for wireless communication. In the time gaps, a UE can deprioritize certain normally performed processes and functions to spare processing power and/or resources for performing AI/ML model related functions.

Figure 1:
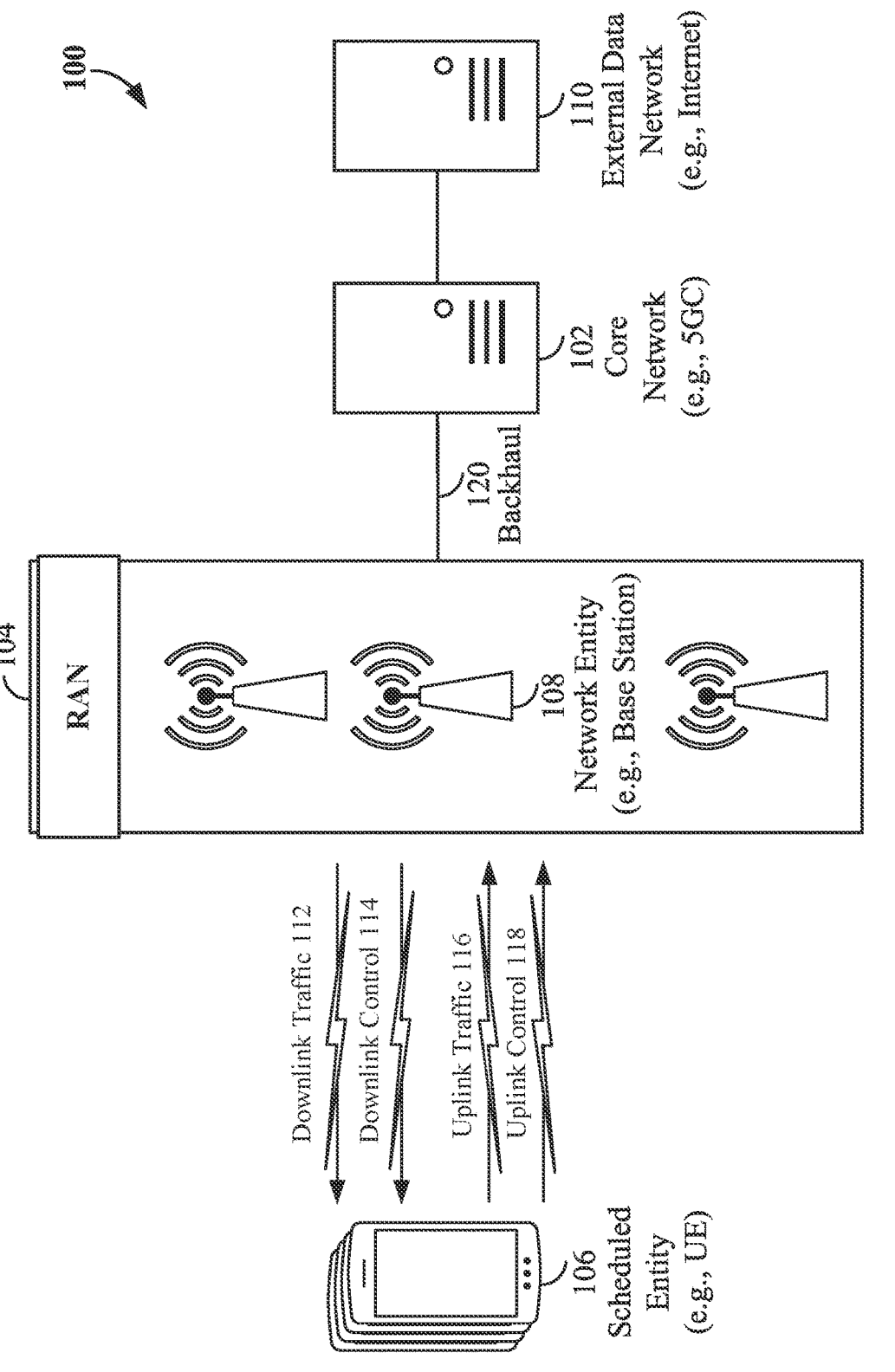
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a UE 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, radio frequency (RF) chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at an entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a network entity (e.g., a base station 108) allocates resources for communication among some or all devices and equipment within its service area or cell. Within the present disclosure, as discussed further below, the network entity may be responsible for scheduling, assigning, reconfiguring, and releasing resources for one or more scheduled entities. That is, for scheduled communication, UEs 106, which may be scheduled entities, may utilize resources allocated by the network entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a network entity 108 may broadcast downlink traffic 112 to one or more scheduled entities 106. Broadly, the network entity 108 is a node or device responsible for scheduling traffic in a wireless communication network, including the downlink traffic 112 and, in some examples, uplink traffic 116 from one or more scheduled entities 106 to the network entity 108. On the other hand, the scheduled entity 106 is a node or device that receives downlink control information 114, including but not limited to scheduling information (e.g., a grant), synchronization or timing information, or other control information from another entity in the wireless communication network such as the network entity 108. The scheduled entity 106 may further transmit uplink control information 118, including but not limited to a scheduling request or feedback information, or other control information to the network entity 108.

In addition, the uplink and/or downlink control information 114 and/or 118 and/or traffic information 112 and/or 116 may be transmitted on a waveform that may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
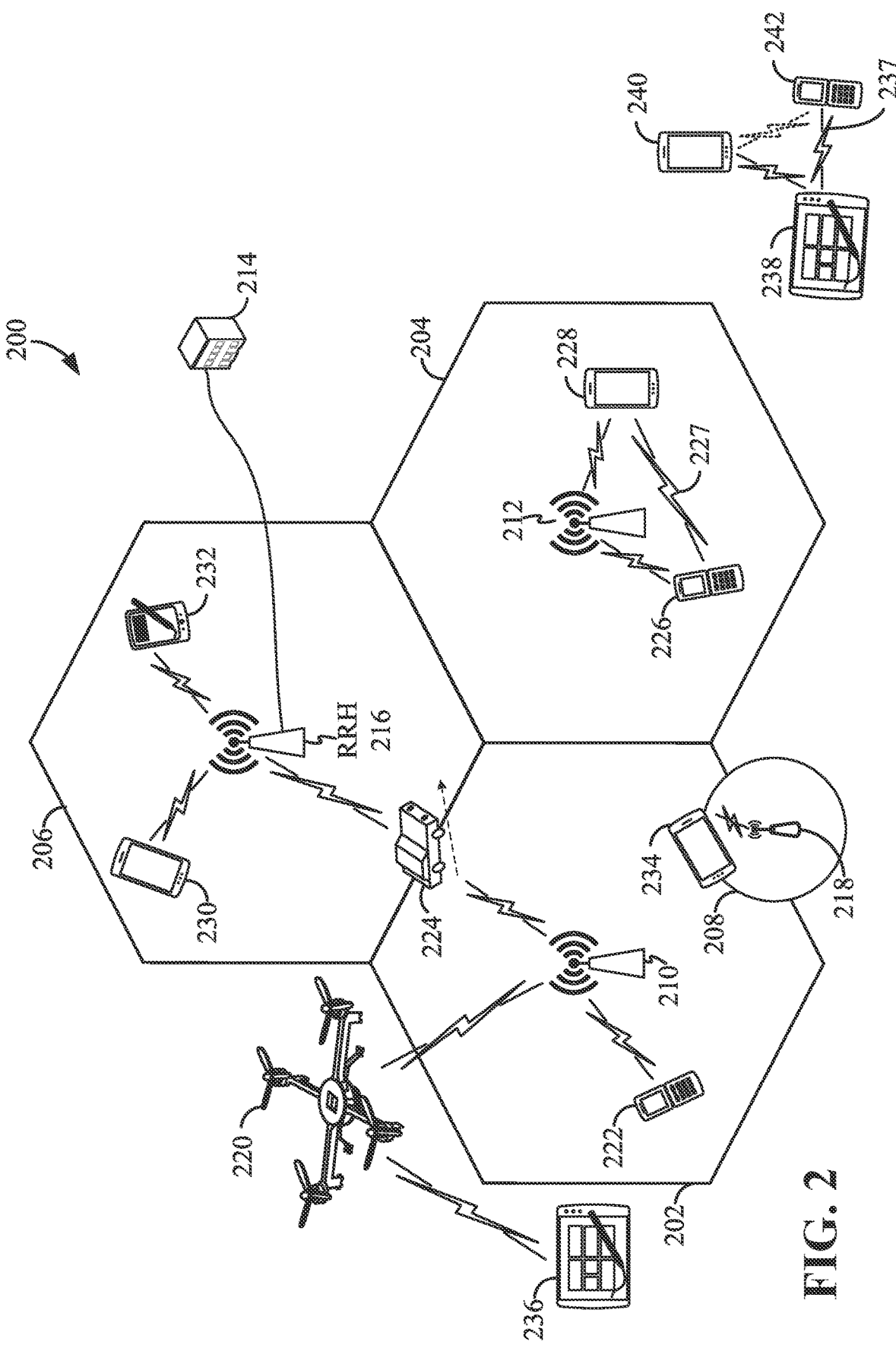
FIG. 2 is an illustration of an example of a radio access network (RAN) according to some aspects.

FIG. 2 is an illustration of an example of a radio access network (RAN) 200 according to some aspects. In some examples, the RAN 200 may be the same as the RAN 104 described above and illustrated in FIG. 1. The geographic area covered by the RAN 200 may be divided into cellular regions (cells) that can be uniquely identified by a UE based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations, base station 210 and base station 212 are shown in cells 202 and 204. A third base station, base station 214 is shown controlling a remote radio head (RRH) 216 in cell 206. That is, a base station can have an integrated antenna or can be connected to an antenna or RRH 216 by feeder cables. In the illustrated example, cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/network entity 108 described above and illustrated in FIG. 1.

FIG. 2 further includes an unmanned aerial vehicle (UAV) 220, which may be a quadcopter or drone. The UAV 220 may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, the UAV 220 (e.g., quadcopter) may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In some examples, a D2D relay framework may be included within a cellular network to facilitate relaying of communication to/from the base station 212 via D2D links (e.g., sidelinks 227 or 237). For example, one or more UEs (e.g., UE 228) within the coverage area of the base station 212 may operate as relaying UEs to extend the coverage of the base station 212, improve the transmission reliability to one or more UEs (e.g., UE 226), and/or to allow the base station to recover from a failed UE link due to, for example, blockage or fading.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) and a security anchor function (SEAF) that perform authentication. The SCMF can manage, in whole or in part, the security context for both the control plane and the user plane functionality.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure the strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may hand over the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next-generation communication networks enables the uplink-based mobility framework and improves the efficiency of both the UE and the network, since the number of mobility messages that need to be exchanged between the UE and the network may be reduced.

The air interface in the radio access network 200 may utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Further, the air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
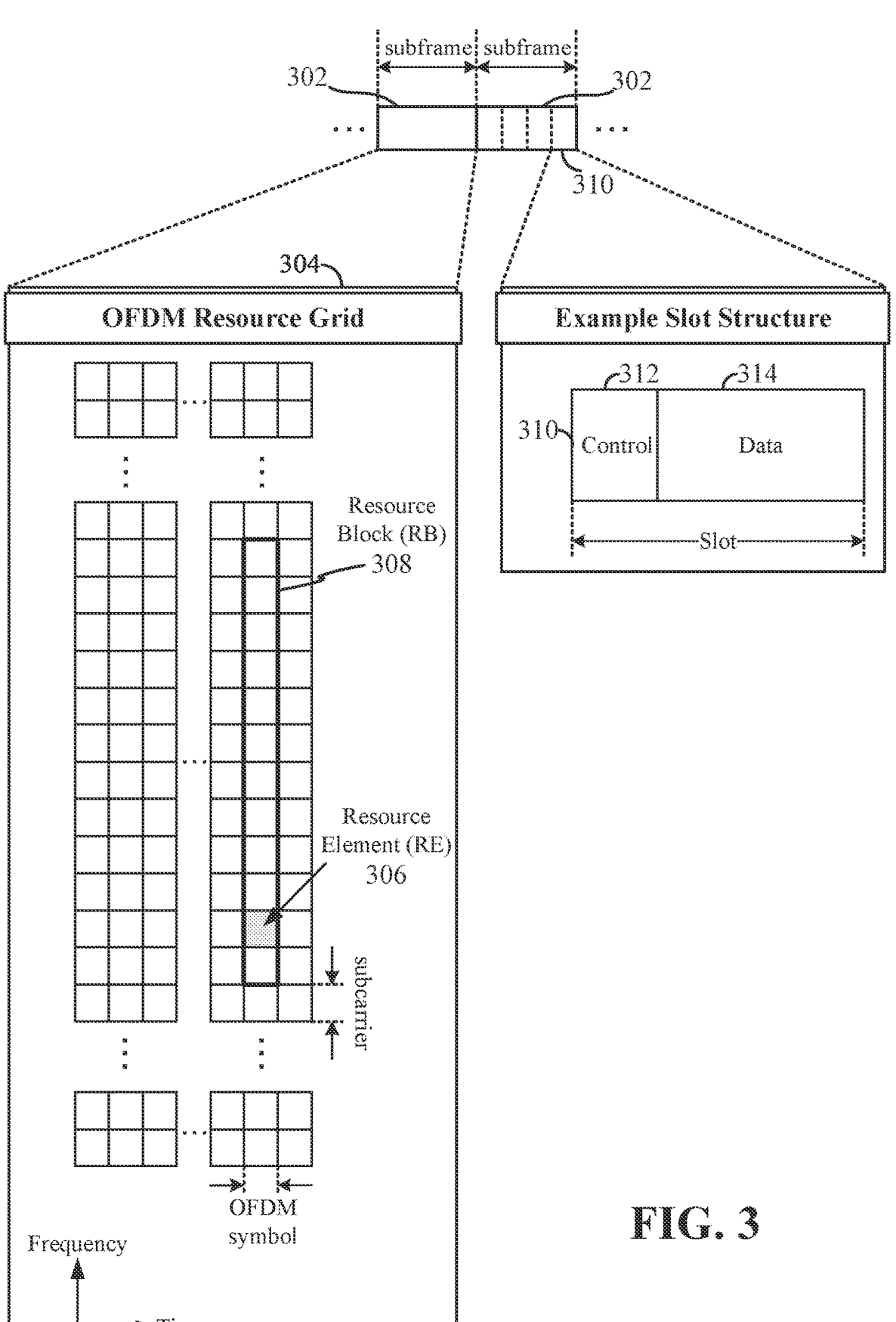
FIG. 3 is a schematic illustration of an organization of wireless resources in an air interface utilizing orthogonal frequency divisional multiplexing (OFDM) according to some aspects.

Referring now to FIG. 3, an expanded view of an exemplary subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers of the carrier.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 308 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 306 within one or more sub-bands or bandwidth parts (BWPs). Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals. These pilots or reference signals may provide for a receiving device to perform channel estimation of the corresponding channel, which may enable coherent demodulation/detection of the control and/or data channels within the RB 308.

In some examples, the slot 310 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed-loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 160 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORE-SET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., a request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs. In some examples, the PDSCH may carry a plurality of SIBs, not limited to SIB1, discussed above. For example, the OSI may be provided in these SIBs, e.g., SIB2 and above.

In an example of sidelink communication over a sidelink carrier via a proximity service (ProSe) PC5 interface, the control region 312 of the slot 310 may include a physical sidelink control channel (PSCCH) including sidelink control information (SCI) transmitted by an initiating (transmitting) sidelink device (e.g., Tx V2X device or other Tx UE) towards a set of one or more other receiving sidelink devices (e.g., Rx V2X device or other Rx UE). The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers illustrated in FIG. 3 are not necessarily all of the channels or carriers that may be utilized between devices, and those of ordinary skill in the art will recognize that other channels or carriers may be utilized in addition to those illustrated, such as other traffic, control, and feedback channels.

Deployment of communication systems, such as 5G new NR systems, may be arranged in multiple manners with various components or constituent parts. In a 5G NR system, or network, a network node, a network entity, a mobility element of a network, a RAN node, a core network node, a network element, or a network equipment, such as a base station (BS), or one or more units (or one or more components) performing base station functionality, may be implemented in an aggregated or disaggregated architecture. For example, a BS (such as an NB, eNB, NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node (e.g., network entity 108). A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 4:
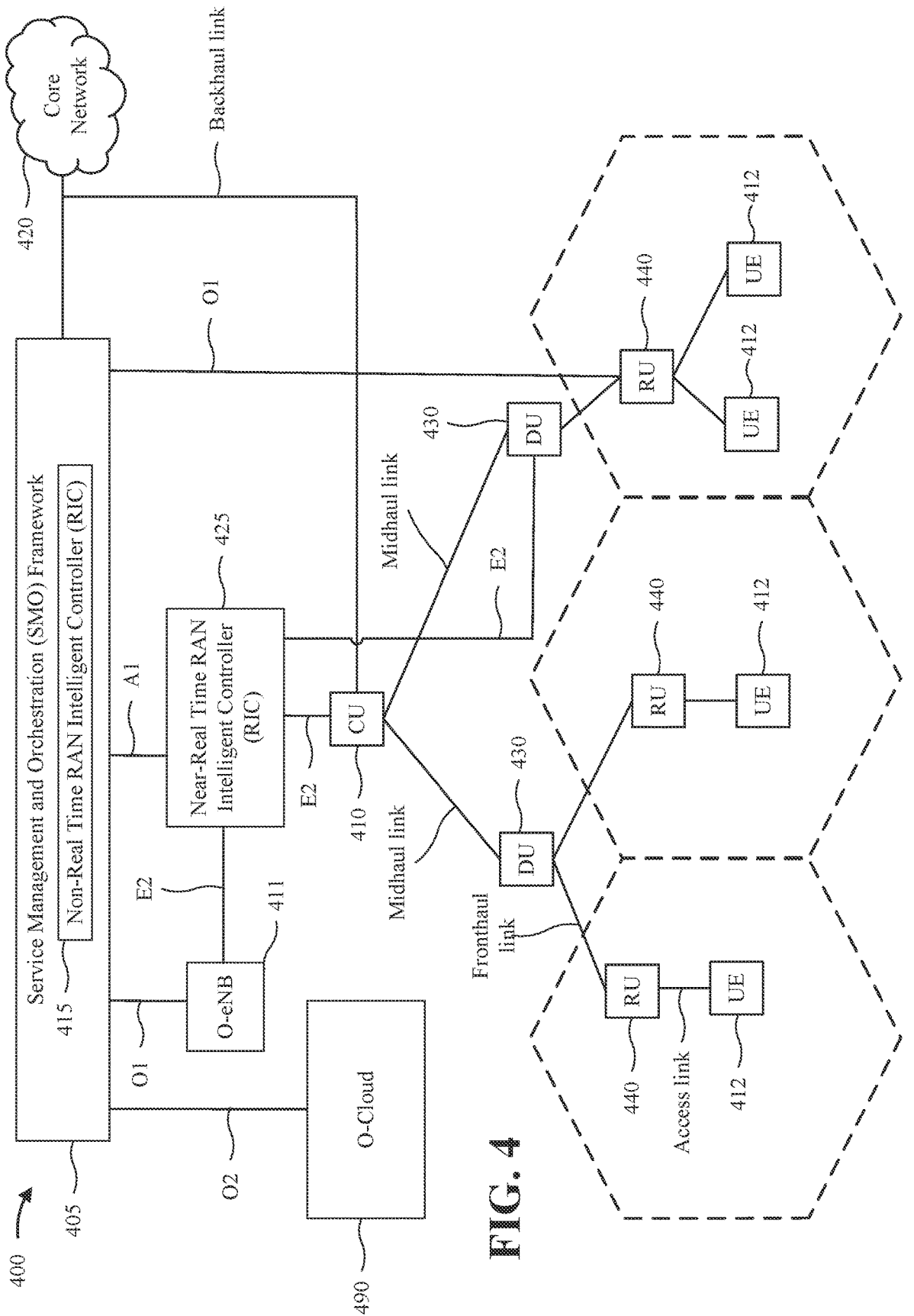
FIG. 4 is a schematic illustrating an example of a disaggregated base station architecture according to some aspects.

FIG. 4 shows a diagram illustrating an example of disaggregated base station architecture 400. The disaggregated base station architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 120 via one or more radio frequency (RF) access links. In some implementations, the UE 120 may be simultaneously served by multiple RUs 440.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or a transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over-the-air (OTA) communication with one or more UEs 412. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via O1) or via the creation of RAN management policies (such as A1 policies).

Figure 5:
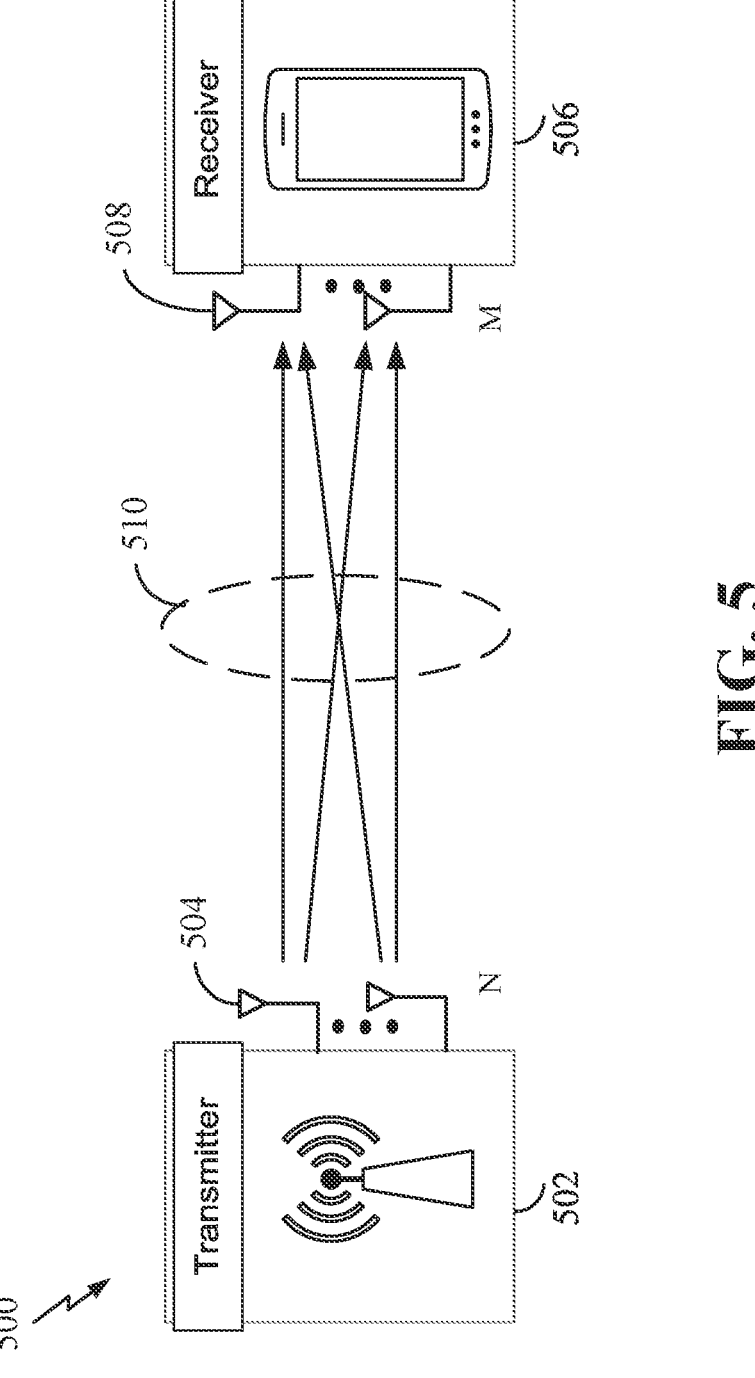
FIG. 5 is a block diagram illustrating a wireless communication system supporting multiple-input multiple-output (MIMO) communication.

In some aspects of the disclosure, the network entity (e.g., base station) and/or scheduled entity (e.g., UE) may be configured for beamforming and/or multiple-input multiple-output (MIMO) technology. FIG. 5 illustrates an example of a wireless communication system 500 supporting MIMO. In a MIMO system, a transmitter 502 includes multiple transmit antennas 504 (e.g., N transmit antennas) and a receiver 506 includes multiple receive antennas 508 (e.g., M receive antennas). Thus, there are N×M signal paths 510 from the transmit antennas 504 to the receive antennas 508. Each of the transmitter 502 and the receiver 506 may be implemented, for example, within a network entity 108, a scheduled entity 106 (e.g., UE), or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This can be achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 500 is limited by the number of transmit or receive antennas 504 or 508, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit CSI-RSs with separate C-RS sequences for each layer to provide for multi-layer channel estimation. From the CSI-RS, the UE may measure the channel quality across layers and resource blocks and feed back the RI and a channel quality indicator (CQI) that indicates to the base station a modulation and coding scheme (MCS) to use for transmissions to the UE for use in updating the rank and assigning REs for future downlink transmissions.

In the simplest case, as shown in FIG. 5, a rank-2 spatial multiplexing transmission on a 2×2 MIMO antenna configuration will transmit one data stream from each transmit antenna 504. Each data stream reaches each receive antenna 508 along a different signal path 510. The receiver 506 may then reconstruct the data streams using the received signals from each receive antenna 508.

Beamforming is a signal processing technique that may be used at the transmitter 502 or receiver 506 to shape or steer an antenna beam (e.g., a transmit beam or receive beam) along a spatial path between the transmitter 502 and the receiver 506. Beamforming may be achieved by combining the signals communicated via antennas 504 or 508 (e.g., antenna elements of an antenna array module) such that some of the signals experience constructive interference while others experience destructive interference. To create the desired constructive/destructive interference, the transmitter 502 or receiver 506 may apply amplitude and/or phase offsets to signals transmitted or received from each of the antennas 504 or 508 associated with the transmitter 502 or receiver 506.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In 5G NR systems, particularly for FR2 (millimeter wave) systems, beamformed signals may be utilized for most downlink channels, including the PDCCH and PDSCH. In addition, broadcast control information, such as the synchronization signal block (SSB), slot format indicator (SFI), and paging information, may be transmitted in a beam-sweeping manner to enable all UEs in the coverage area of a network entity (e.g., TRP, gNB) to receive the broadcast control information. In addition, for UEs configured with beamforming antenna arrays, beamformed signals may also be utilized for uplink channels, including the PUCCH and PUSCH. In addition, beamformed signals may further be utilized in D2D systems, such as NR sidelink (SL) or V2X, utilizing FR2.

Figure 6:
FIG. 6 is a diagram illustrating an example of a multiple transmission and reception points environment according to some aspects.

FIG. 6 is a diagram illustrating an example of a multi-TRP environment 600 according to some aspects. The multi-TRP environment 600 includes a plurality of cells 602 and 606a-606d. In some examples, one of the cells 602 may be considered a primary serving cell (PCell) 602 and the remaining cells 606a, 606b, 606c, and 306d may be considered secondary serving cells (SCells). The PCell 602 may be referred to as the anchor cell that provides a radio resource control (RRC) connection to the UE. In some examples, the PCell and the SCell may be collocated (e.g., different TRPs at the same geographical location and coupled to the same antenna tower/pole).

When carrier aggregation is configured, one or more of the SCells 606a-606d may be activated or added to the PCell 602 to form the serving cells serving a UE 610. Each serving cell can correspond to a component carrier (CC). The CC of the PCell 602 may be referred to as a primary CC, and the CC of an SCell 606a-606d may be referred to as a secondary CC. The PCell 602 and one or more of the SCells 606 may be served by a respective TRP 604 and 608a-608c similar to any of those illustrated in FIGS. 2 and 4. In the example shown in FIG. 6, SCells 606a-606c are each served by a respective non-collocated TRP 608a-608c. However, SCell 606d is collocated with the PCell 602. Thus, TRP 604 may include two collocated TRPs, each supporting a different carrier. For example, TRP 604 may correspond to a base station including multiple collocated TRPs. The coverage of the PCell 602 and SCell 606d may differ since different component carriers (which may be in different frequency bands) may experience different path loss.

In some examples, the PCell 602 may add or remove one or more of the SCells 606a-606d to improve reliability of the connection to the UE 610 and/or increase the data rate. The PCell 602 may be changed upon a handover to another PCell.

In some examples, one of the cells (e.g., cell 602) may be a low band cell, and another cell (e.g., cell 606d) may be a high band cell. A low band cell uses a carrier frequency in a frequency band lower than that of the high band cells. For example, the high band cell may use a high band mmWave carrier (e.g., FR4-a or FR4-1 or above), and the low band cell may use a low band mmWave carrier (e.g., FR2). In this example, carrier aggregation may not be performed between the cells 602 and 606d, depending on whether carrier aggregation across frequency bands is supported. In addition, when using mmWave carriers (FR2 or above), beamforming may be used to transmit and receive signals.

Artificial Intelligence and Machine Learning (AI/ML) for Air Interface

In some aspects, artificial intelligence and machine learning (AI/ML) may be used in wireless communications, for example, operations of an air interface between a network (e.g., RAN 200) and a UE. In some aspects, an AI/ML augmented air interface may have enhanced performance and/or reduced complexity and overhead. For example, the air interface (e.g., 5G NR) using AI/ML may have improved throughput, robustness, accuracy, reliability, etc. In one aspect, an AI/ML model can be used for CSI feedback enhancement, for example, overhead reduction, improved accuracy, and prediction. In one aspect, an AI/ML model can be used for beam management, for example, beam prediction in time and/or spatial domain, overhead and latency reduction, beam selection accuracy improvement, etc. In one aspect, an AI/ML model can be used for positioning accuracy enhancements in various scenarios including, for example, conditions with significant non-line-of-sight conditions.

The application of an AI/ML model in wireless communication, can involve various processes, for example, model training, model inference, model validation, model testing, model activation, model deactivation, and model switching. In some aspects, a UE and a network entity (e.g., a base station, gNB, etc.) can have different levels of collaboration in different use cases of AI/ML models. In one aspect, no collaboration occurs between the UE and the network entity to use an AI/ML model. In this case, the UE and/or network entity can implement respective AI/ML models or algorithms without information exchange. In one aspect, signaling-based collaboration may be used without model transfer. For example, the UE can use signaling with a network entity to support training, inference, and/or verification of a predetermined AI/ML model without transferring or downloading the AI/ML model from the network. In one aspect, signaling-based collaboration may be used with AI/ML model transfer.

AI/ML model training is a process used to train an AI/ML model (e.g., by learning the input/output relationship of the model) in a data-driven manner and obtain the trained AI/ML model for inference. AI/ML model inference is a process of using a trained AI/ML model to produce a set of outputs based on a set of inputs. AI/ML validation is a process of evaluating the quality of an AI/ML model using a dataset different from the one used for model training. This process can help to select model parameters that generalize beyond the dataset used for model training.

AI/ML model testing is a process used to evaluate the performance of an applied AI/ML model using a dataset different from the one used for model training and validation. Different from the AI/ML model validation process, model testing may not perform subsequent tuning of the model. AI/ML model activation is a process used to enable an AI/ML model. AI/ML model deactivation is a process used to disable an AI/ML model. AI/ML model switching is a process used to deactivate a currently active AI/ML model and activate a different AI/ML model.

When a UE and a network entity (e.g., base station, gNB, CU, DU, TRP) collaborate to select an AI/ML model for wireless communication, the UE may perform various processes and collect data as per the network entity's request. The collected data may be reported to the network entity. Before applying an AI/ML model (e.g., a model downloaded from a network entity or preconfigured), the UE may perform various processes, for example, model training and/or verification. For example, the UE and the network entity may check the performance of a newly updated/downloaded AI/ML model before applying the model to normal operations.

However, some UEs may have limited processing power, memory, and/or resources. In some cases, a UE may not be able to perform a wireless communication operation (e.g., DL reception and/or UL transmission) while performing the aforementioned AI/ML model related functions or processes (e.g., data collection, training, verification, compiling, switching, etc.). For example, UE constraints (e.g., time/frequency resources, physical channel/signal usage, communication directions (DL/UL), etc.) may depend on the AI/ML model and/or the purpose or usage of the AI/ML model (e.g., L1 and/or L3 measurements, beam management, CSI reporting, positioning, etc.). In some aspects, the UE can deprioritize some processes or operations normally used for wireless communication at the UE in order to perform some AI/ML model related functions (e.g., training, inference, validation, testing, activation, deactivation, switching, compiling, etc.). To that end, a UE or scheduled entity can perform AI/ML model related functions ("model functions") in one or more configured time gaps in which the UE can deprioritize some normally performed wireless communication functions.

Time Gaps for AI/ML Model Operations

Figure 7:
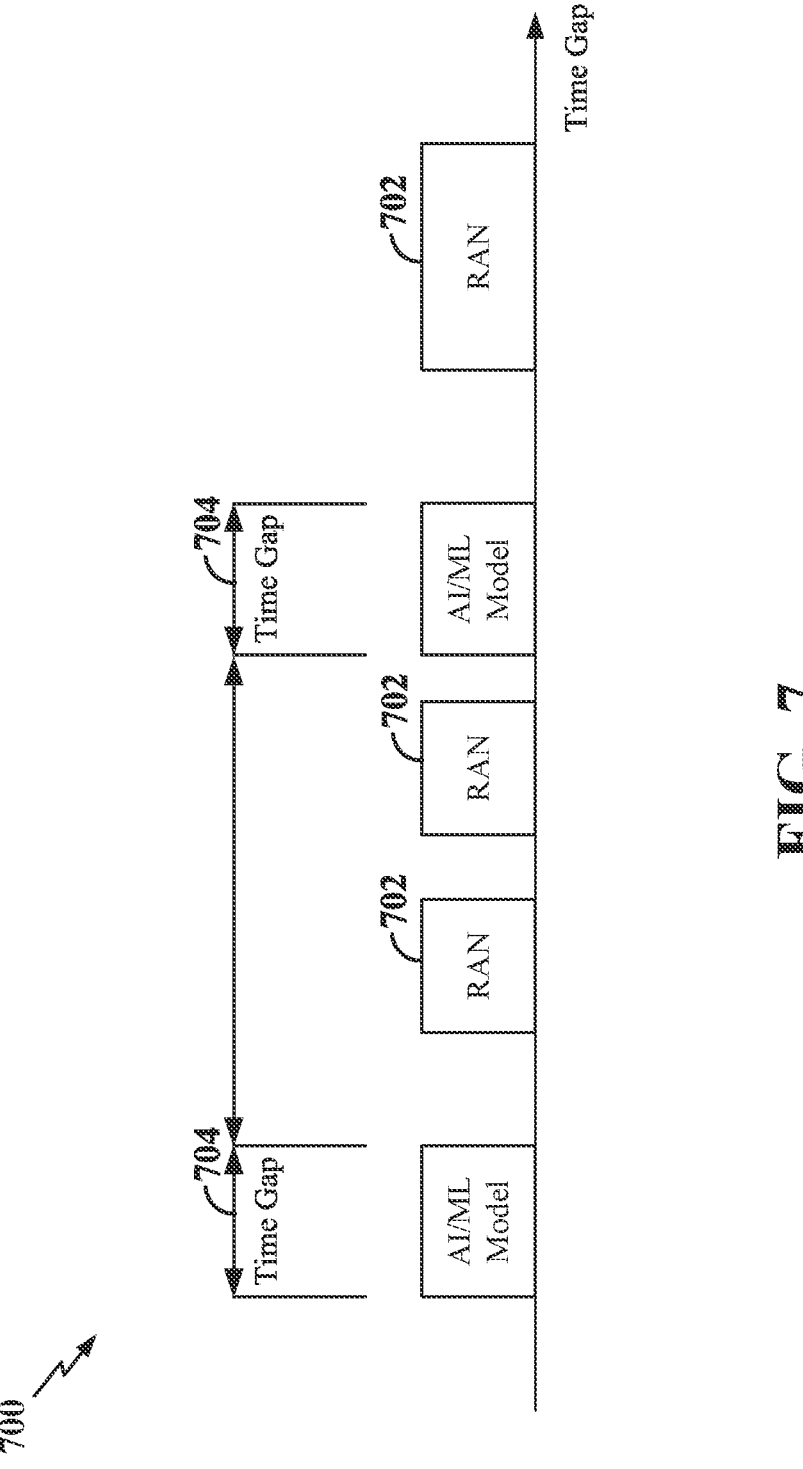
FIG. 7 is a diagram illustrating exemplary time gaps for performing artificial intelligence and machine learning (AI/ML) related functions according to some aspects.

FIG. 7 is a drawing illustrating exemplary time gaps configured for performing AI/ML model related functions according to some aspects of the disclosure. FIG. 7 illustrates a timeline 700 in which a UE can communicate with a network entity (e.g., a base station, gNB, TRP, CU, DU, etc.) using normally performed or scheduled RAN functions 702 (e.g., DL and/or UL communication, measurements and reporting, etc.) in a RAN (e.g., RAN 200, NG-RAN, O-RAN, etc.) or air interface. In some aspects, a UE may perform AI/ML model functions in one or more AI/ML model time gaps 704 (e.g., two exemplary AI/ML model time gaps 704 shown in FIG. 7). In some aspects, the UE can be configured with one or more aperiodic and/or periodic AI/ML model time gaps 704.

Examples of AI/ML model functions include model training, model inference, model validation, model testing, model compiling, model activation, model deactivation, and model switching. In some cases, due to UE limitations (e.g., UE data/signal processing power and/or resource limitations), a UE can deprioritize some normally performed or scheduled RAN functions (e.g., PDCCH/PDSCH reception, PUCCH/PUSCH transmission, channel/beam/signal measurements, CSI report, etc.) in one or more AI/ML model time gaps. Deprioritizing certain RAN functions can reduce the resource and/or processing requirements at the UE so that the UE can spare processing power and/or resources to perform one or more AI/ML model functions as described above. Unlike a measurement gap (e.g., a legacy measurement gap) commonly used for cell measurement, each AI/ML model time gap 704 can be selectively configured for one or more specific carriers, SCells, BWPs, and/or RAN functions. That is, if an AI/ML model time gap 704 is configured for a subset of carriers, BWPs, or RAN functions used by the UE, the UE may use the carrier/BWP and/or perform the RAN functions that are not configured with the AI/ML model time gap.

In some aspects, an AI/ML model time gap (e.g., a training gap) can be defined by a gap pattern that includes a gap offset, a gap duration, and a gap periodicity (for periodic time gaps). The gap offset is the first subframe of each time gap that occurs at a system frame number (SFN) and subframe meeting the following condition: SFN mod T=FLOOR (Gap offset/L); subframe=Gap offset mod L; with T=Gap periodicity/L. L can be 10 or any preconfigured value. The gap offset and gap duration for aperiodic AI/ML time gaps can be dynamically scheduled by the network using DCI and/or MAC CE signaling.

Figure 8:
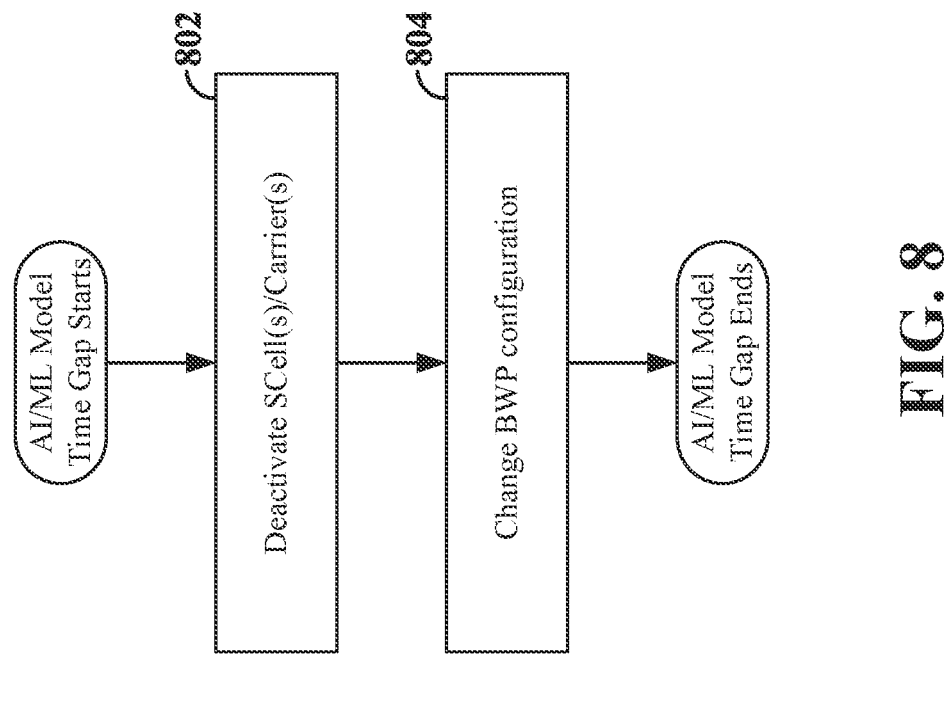
FIG. 8 is a flow chart illustrating a process of deprioritizing RAN functions in an AI/ML model time gap according to some aspects.

FIG. 8 is a flow chart illustrating a process 800 of deprioritizing RAN functions in an AI/ML model time gap according to some aspects. At 802, a UE can temporarily deactivate one or more SCells (or associated CC(s)) in an AI/ML model time gap. In one aspect, the deactivated SCell(s) may not include an SCell associated with a PUCCH or an SCell associated with a PRACH configuration. At 804, the UE can temporarily change a BWP configuration to reduce processing and/or resource usage. For example, the UE can switch from an active BWP to a dormant BWP or a narrower BWP. In a dormant BWP, some RAN operations can be restricted, suspended, or subject to one or more constraints. For example, the UE may not receive a PDCCH and/or a PDSCH from a deactivated SCell, and the UE may not transmit a PUCCH or a PUSCH to the deactivated SCell.

Further, using a dormant BWP or a narrower BWP, the UE can reduce the need for processing power and/or resources (e.g., time, frequency, and/or spatial resources). Thus, the UE can repurpose available processing power (e.g., computation power and/or memory) and communication resources (e.g., time, frequency, and/or spatial resources) for AI/ML model related functions.

In other aspects, the UE can deactivate SCell(s) and/or change BWP configuration in various orders and manners different from that illustrated in FIG. 8. In one example, UE can change the BWP configuration first and then deactivate SCell(s). In one example, the UE can only change BWP configuration or deactivate SCell(s). After the time gap lapses, the UE can resume normal RAN operations. For example, the UE can reactivate the deactivated SCell(s) and/or restore the previous BWP configuration.

Figure 9:
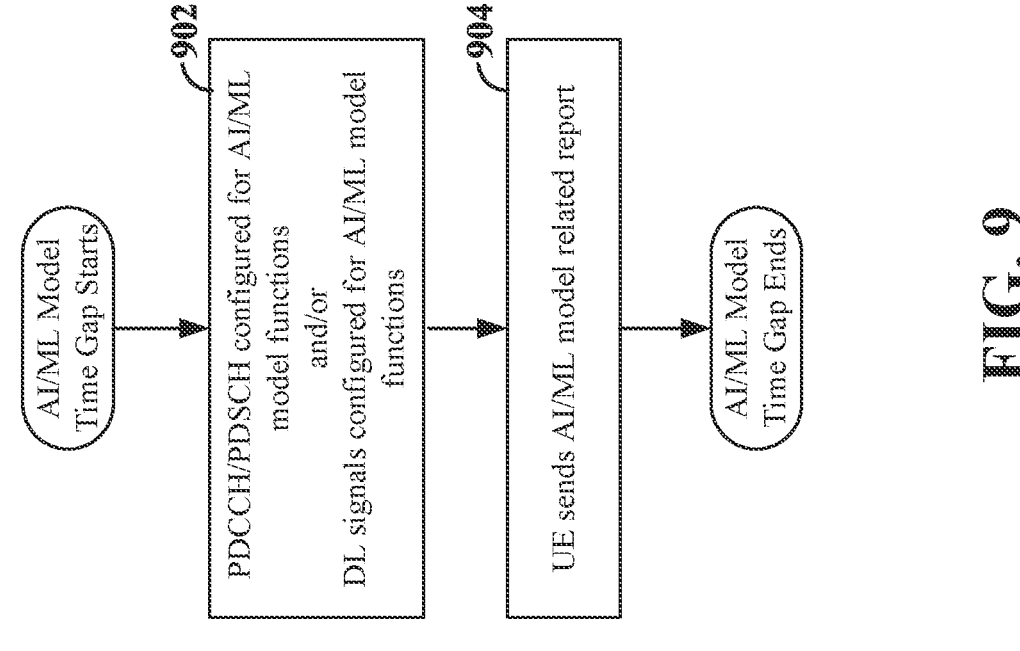
FIG. 9 is a flow chart illustrating a process of performing AI/ML model related functions in an AI/ML model time gap according to some aspects.

FIG. 9 is a flow chart illustrating a process 900 of performing AI/ML model related functions in an AI/ML model time gap. In an AI/ML model time gap, a network entity (e.g., a base station, gNB) may send certain signals (e.g., PDCCH, PDSCH, and/or reference signals) to a UE to facilitate various AI/ML model related functions performed at the UE and/or network entity.

At 902, the network entity can send PDCCH/PDSCH transmissions and/or DL signals that are configured for AI/ML model related functions (e.g., model training, model compiling, model verification, and/or model switching). In some aspects, the network entity can configure and send PDCCH/PDSCH transmissions in specific or predetermined formats that can be recognized and used by the UE to perform AI/ML model related functions (e.g., model training, model testing, model validation, etc.) during an AI/ML model time gap. In some aspects, the network entity can send specific reference signals (e.g., non-cell-defining SSB (NCD-SSB), CSI-RS, etc.) that can be used by the UE for AI/ML model related functions. These AI/ML model related PDCCH/PDSCH and/or DL signals can be made available to all UEs for use in, for example, AI/ML model training (e.g., learning, parameters tuning) and/or model verification and testing.

In the AI/ML model time gap, the network entity can discard or ignore UE feedback such as ACK/NACK feedback, measurement report, CSI report, etc. that may be transmitted by the UE in response to the AI/ML related DL signals or PDCCH/PDSCH transmissions. However, in a legacy or normal measurement gap not related to the AI/ML model, the UE may not receive PDCCH/PDSCH and can skip UL transmission.

In some aspects, the UE can be configured not to send corresponding feedback (e.g., ACK/NACK) to the PDCCH/PDSCH that is specifically configured for AI/ML model related functions. In some aspects, the UE can be configured not to send reports (e.g., measurements, CSI report, etc.) corresponding to the DL signals configured for AI/ML model related functions. In some aspects, at 904, the network entity can configure the UE to send a report for AI/ML model related functions performed in the time gap, for example, based on the PDCCH/PDSCH and/or DL signals received in the time gap. For example, the report can include data for facilitating certain AI/ML model functions (e.g., model selection, training results (e.g., reliability level of a model), verification, etc.).

In some aspects, during an AI/ML model related time gap, the UE can be configured to perform AI/ML model related functions in specific cell(s) (e.g., serving cells). That is, the UE can select certain cell(s) (i.e., not all cells) to perform the AI/ML related functions. In one example, the UE can be configured not to monitor a PDCCH in a cell that is used for AI/ML model related functions. To that end, the PDCCH can be scrambled by an identifier (e.g., Radio Network Temporary Identifier (RNTI)) or allocated in specific search space resource sets. In one example, the UE can be configured not to demodulate a PDSCH in a cell that is used for AI/ML model related functions. The PDSCH may have a rank higher than a predetermined rank (e.g., rank 2 or more) and/or RBs greater than a predetermined number of RBs. In some aspects, during an AI/ML model related time gap, the UE may demodulate a PDSCH with a rank lower than a predetermined rank and/or a predetermined number of RBs. In one example, in a cell that is used for AI/ML model related functions, the UE can be configured not to transmit uplink channels/signals (e.g., PUCCH/PUSCH) except channels/signals used for an AI/ML model function (e.g., AI/ML model compilation report, model switching completion, etc.).

In some aspects, the above-described behavior of the UE and/or network entity in an AI/ML model time gap can be different in different time gaps, for example, a training time gap, a compiling time gap, and a model switching time gap. In one example, if the UE downloaded an AI/ML model from the network, the UE may have to compile the AI/ML model into an executable code. In this case, the UE may be configured to use a model compiling time gap. In one example, the UE may be configured to use a model switching time gap to switch between AI/ML models or replacing a previously activated AI/ML model.

AI/ML Model Time Gap Configuration

Figure 10:
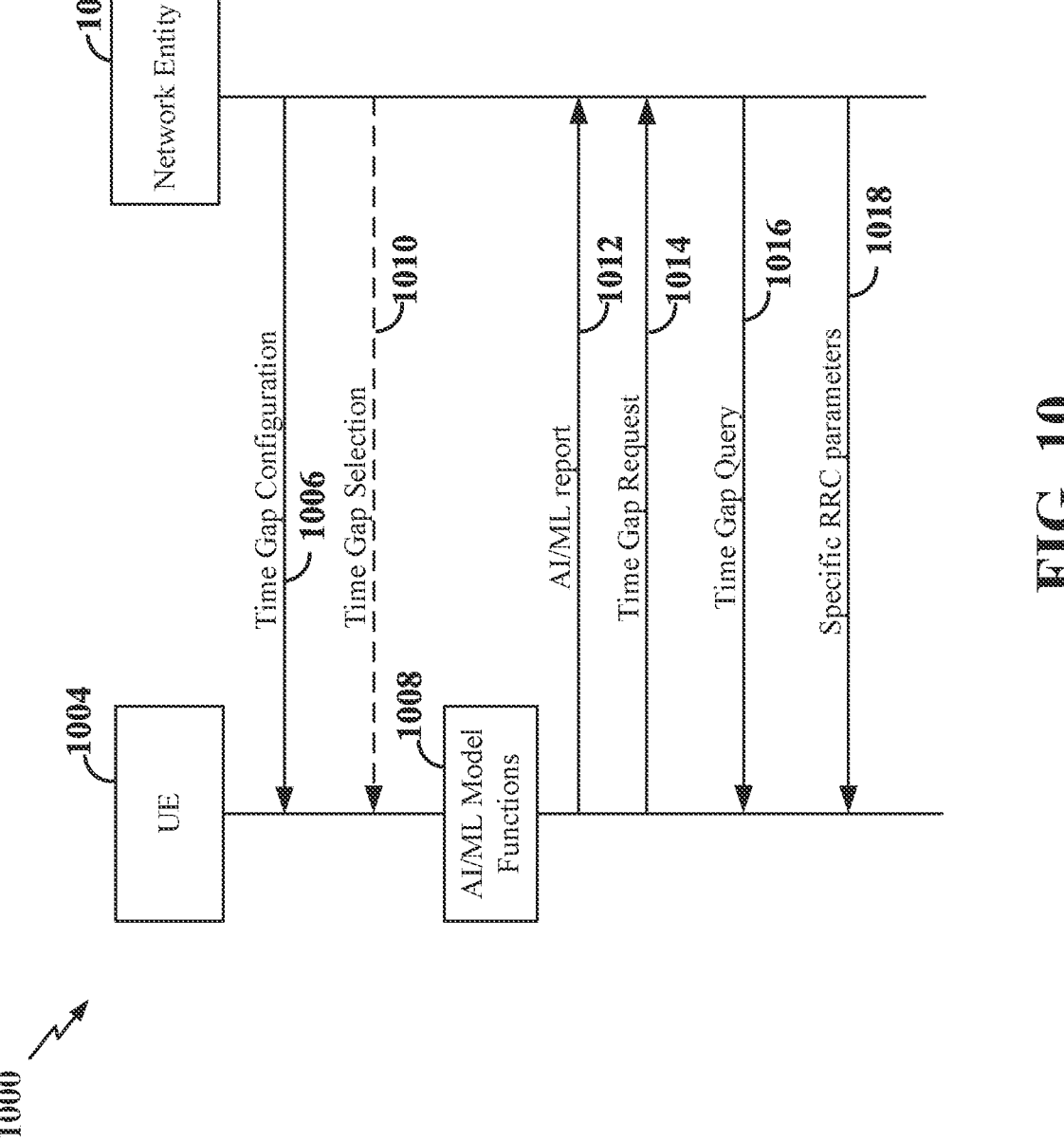
FIG. 10 is a signaling diagram illustrating exemplary signaling between a network entity and a user equipment (UE) to configure AI/ML model time gaps in a wireless network according to some aspects.

FIG. 10 is a signaling diagram illustrating an exemplary signaling process 1000 between a network entity 1002 and a UE 1004 to configure AI/ML model time gaps in a wireless network. In some aspects, the network entity 1002 can configure the UE 1004 with one or more AI/ML model time gaps (e.g., a model training time gap, a model compiling time gap, and a model switching time gap).

At 1006, the network entity 1002 can send AI/ML time gap configuration to the UE 1004, for example, using RRC signaling. The network entity 1002 can configure one or more aperiodic and/or periodic AI/ML model time gaps (e.g., time gaps 704 of FIG. 7). The UE may use multiple AI/ML models, and each AI/ML model may be associated with one or more configured AI/ML model time gaps. For example, the UE can use the time gaps for various AI/ML model related processes or functions (e.g., training, verification, compiling, and/or switching).

At 1008, the UE can perform AI/ML model related functions using the configured AI/ML model time gap(s). The association between an AI/ML model and a time gap can be preconfigured (e.g., by an original equipment manufacturer (OEM) based on one or more standards or specifications) or configured by the network entity. For example, at 1010, the network entity 1002 may select an AI/ML model time gap for performing AI/ML model related functions by sending a time gap selection message (e.g., a MAC control element (MAC-CE) or DCI) to the UE. In some aspects, when multiple AI/ML model time gaps are configured for an associated AI/ML model, the UE may select the AI/ML model time gap(s) without receiving an indication from the network entity.

At 1012, after performing the AI/ML model related functions (e.g., model training, verification, testing, etc.), the UE can send an AI/ML report to the network entity 1002. For example, the AI/ML report can include data for facilitating certain AI/ML model functions (e.g., model selection, training results (e.g., reliability level of a model), validation, etc.). For example, the UE can send the AI/ML report in a PUCCH or PUSCH transmission. In some aspects, the UE may not send an AI/ML report after performing some AI/ML model related functions, for example, model compilation and model switching, etc.

At 1014, the UE may explicitly request a time gap by sending a message to the network entity. For example, the UE can send the request (e.g., NeedforGap) using UCI or MAC CE. At 1016, the network entity may query the UE about whether or not the UE needs a time gap (e.g., aperiodic time gap) and/or a time gap pattern (e.g., periodic time gaps) for performing AI/ML model related functions. For example, the query can indicate a condition for which the UE may need a time gap to perform AI/ML model functions. For example, the condition can indicate the AI/ML model(s) and memory/computational complexity related parameters such as carrier aggregation, BWP, MIMO configuration, etc., needed to perform the AI/ML functions. Based on the indicated condition, the UE can decide whether or not time gap(s) will be needed to perform the AI/ML model related functions.

In some aspects, at 1018, the network entity 1002 can provide a set of parameters (e.g., RRC parameters) to the UE for use in the AI/ML model time gap(s) while performing AI/ML model related functions. For example, the set of RRC parameters may include a discontinuous reception (DRX) configuration, a MIMO configuration, a CSI measurement and report configuration, etc. that enable the UE to deprioritize some normally performed RAN-related or air interface functions (e.g., skipping PDCCH monitoring, reducing processing power for MIMO decoding and/or CSI calculation, etc.)

Figure 11:
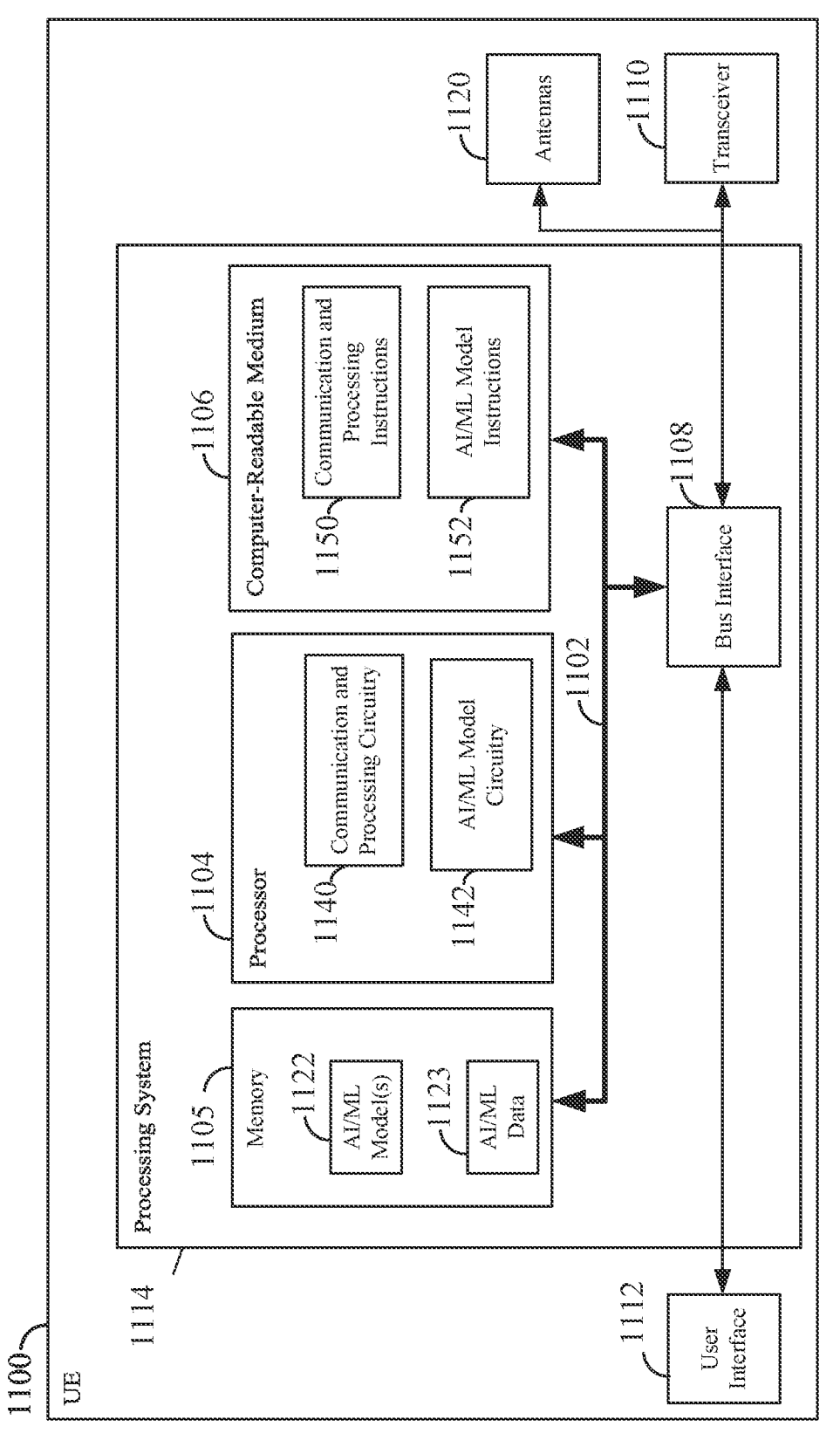
FIG. 11 is a block diagram illustrating an example of a hardware implementation for a UE according to some aspects.

FIG. 11 is a block diagram illustrating an example of a hardware implementation for a user equipment (UE) 1100 employing a processing system 1114. For example, the UE 1100 may be a user equipment (UE) as illustrated in any one or more of FIGS. 1, 2, 4, 6, and/or 10.

The UE 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1100 may be configured to perform any one or more of the functions described herein. That is, the processor 1104, as utilized in the UE 1100, may be used to implement any one or more of the processes and procedures described and illustrated in FIGS. 7-10 and 12.

The processor 1104 may in some instances be implemented via a baseband or modem chip and in other implementations, the processor 1104 may include a number of devices distinct and different from a baseband or modem chip (e.g., in such scenarios as may work in concert to achieve examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110. The transceiver 1110 and an antenna array 1120 (e.g., one or more antennas) provide a communication interface or means for communicating with various other apparatus over a transmission medium. Depending upon the nature of the apparatus, a user interface 1112 (e.g., keypad, display, speaker, microphone, joystick, touchscreen) may also be provided. Of course, such a user interface 1112 is optional, and may be omitted in some examples, such as a base station.

The processor 1104 is responsible for managing the bus 1102 and general processing, including the execution of software stored on the computer-readable medium 1106. The software, when executed by the processor 1104, causes the processing system 1114 to perform the various functions described herein for any particular apparatus. The computer-readable medium 1106 and the memory 1105 may also be used for storing data (e.g., AI/ML model(s) 1122 and associated data 1123) that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106. The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1104 may include circuitry configured for various functions, including, for example, AI/ML model related functions for wireless communication in a RAN (e.g., RAN 200 and RAN 400).

For example, the circuitry may be configured to implement one or more of the functions described herein in relation to FIGS. 7-10 and 12.

In some aspects of the disclosure, the processor 1104 may include communication and processing circuitry 1140 configured for various functions, including for example communicating with a network entity (e.g., a base station, gNB, CU, DU, RU, TRP) or any other entity. In some examples, the communication and processing circuitry 1140 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1140 may include one or more transmit/receive chains. In addition, the communication and processing circuitry 1140 may be configured to transmit and process uplink traffic and uplink control messages (e.g., similar to uplink traffic 116 and uplink control 118 of FIG. 1), receive and process downlink traffic and downlink control messages (e.g., similar to downlink traffic 112 and downlink control 114). The communication and processing circuitry 1140 may further be configured to execute communication and processing software 1150 stored on the computer-readable medium 1106 to implement one or more functions described herein.

In some implementations where the communication involves receiving information, the communication and processing circuitry 1140 may obtain information from a component of the UE 1100 (e.g., from the transceiver 1110 that receives the information via radio frequency signaling or some other type of signaling suitable for the applicable communication medium), process (e.g., decode) the information, and output the processed information. For example, the communication and processing circuitry 1140 may output the information to another component of the processor 1104, to the memory 1105, or to the bus interface 1108. In some examples, the communication and processing circuitry 1140 may receive one or more of signals, messages, other information, or any combination thereof. In some examples, the communication and processing circuitry 1140 may receive information via one or more channels. In some examples, the communication and processing circuitry 1140 may include functionality for a means for receiving. In some examples, the communication and processing circuitry 1140 may include functionality for a means for processing, including a means for demodulating, a means for decoding, etc.

In some implementations where the communication involves sending (e.g., transmitting) information, the communication and processing circuitry 1140 may obtain information (e.g., from another component of the processor 1104, the memory 1105, or the bus interface 1108), process (e.g., modulate, encode, etc.) the information, and output the processed information. For example, the communication and processing circuitry 1140 may output the information to the transceiver 1110 (e.g., that transmits the information via radio frequency signaling or some other type of signaling suitable for the applicable communication medium). In some examples, the communication and processing circuitry 1140 may send one or more of signals, messages, other information, or any combination thereof. In some examples, the communication and processing circuitry 1140 may send information via one or more channels. In some examples, the communication and processing circuitry 1140 may include functionality for a means for sending (e.g., a means for transmitting). In some examples, the communication and processing circuitry 1140 may include functionality for a means for generating, including a means for modulating, a means for encoding, etc.

In some aspects, the communication and processing circuitry 1140 can be configured to deprioritize wireless communication or RAN functions to increase available resources and/or processing power for performing the AI/ML model related function(s) as described herein. For example, AI/ML model related functions may include model compiling, model training, model inference, model validation, model testing, model activation, model deactivation, model switching, etc. In one aspect, the communication and processing circuitry 1140 can deprioritize UL and/or DL communication, for example, by deactivating communication with one or more SCell(s) during an AI/ML model time gap. In one aspect, the communication and processing circuitry 1140 can temporarily change a BWP configuration to reduce processing and/or resource usage. For example, the UE can switch from an active BWP to a dormant BWP or a narrower BWP.

In some aspects of the disclosure, the processor 1104 may include AI/ML model circuitry 1142 that can be configured to perform various AI/ML model related functions in one or more AI/ML model time gaps. For example, the AI/ML model circuitry 1142 can be configured to perform model compiling, model training, model inference, model validation, model testing, model activation, model deactivation, model switching, etc., of one or more AI/ML models. For example, one or more AI/ML models 1122 and associated AI/ML data 1123 may be stored in the memory 1105. The AI/ML models 1122 may be downloaded from a network entity and/or predefined. The UE can perform AI/ML model related functions ("model functions") in one or more time gaps in which the UE can deprioritize some wireless communication functions to spare extra resources and/or processing power. The AI/ML model circuitry 1142 may further be configured to execute AI/ML model software 1152 stored on the computer-readable medium 1106 to implement one or more functions described herein.

Figure 12:
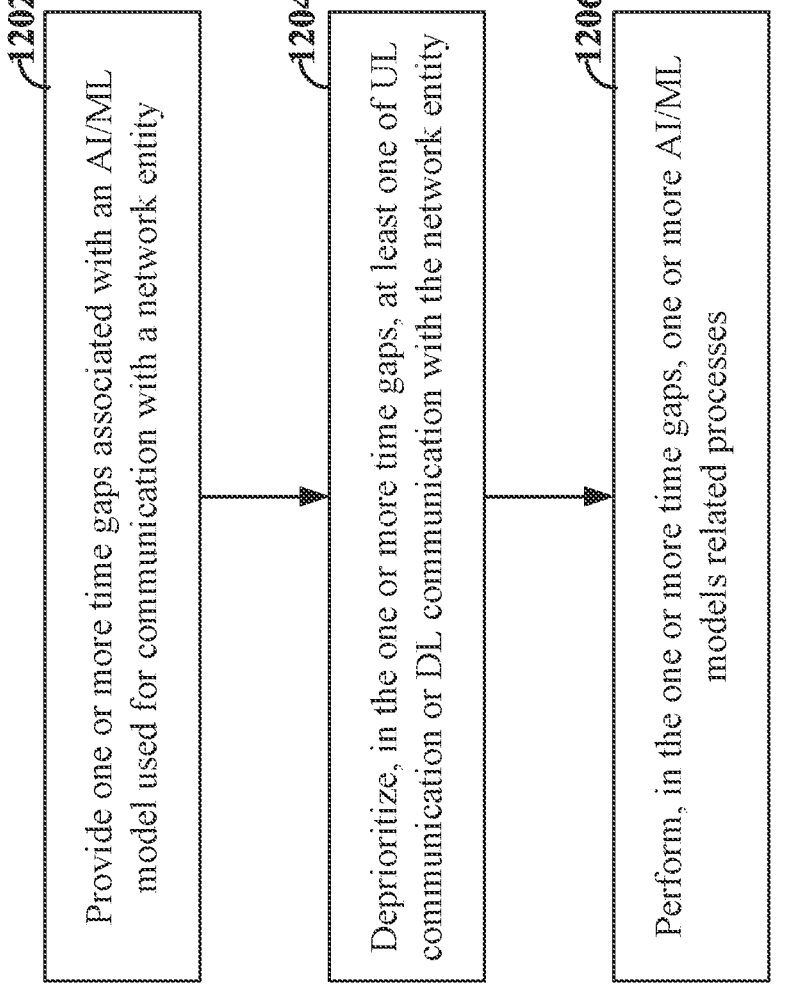
FIG. 12 is a flow chart illustrating an exemplary process for performing AI/ML model related functions at a UE according to some aspects.

FIG. 12 is a flow chart illustrating an exemplary process 1200 for performing AI/ML model related functions at a UE in accordance with some aspects. As described below, some or all illustrated features may be omitted in a particular implementation within the scope of the present disclosure, and some illustrated features may not be required for the implementation of all examples. In some examples, the process 1200 may be carried out by the UE 1100 illustrated in FIG. 11. In some examples, the process 1200 may be carried out by any suitable apparatus or means for carrying out the functions or algorithm described below.

At block 1202, a UE can provide one or more time gaps associated with an artificial intelligence and machine learning (AI/ML) model used for communication with a network entity. For example, the one or more time gaps may be the same as the time gaps 704 described above in relation to FIG. 7. In one aspect, the AI/ML model circuitry 1142 can be configured as a means to provide the one or more time gaps. The time gaps 704 enable the UE to use an AI/ML model for communication with the network entity. In one example, the AI/ML model can be used for CSI feedback enhancement, for example, overhead reduction, improved accuracy, and prediction. In one example, an AI/ML model can be used for beam management, for example, beam prediction in time and/or spatial domain, overhead and latency reduction, beam selection accuracy improvement, etc. In one example, an AI/ML model can be used for positioning accuracy enhancements in various scenarios including, for example, conditions with significant non-line-of-sight conditions.

At block 1204, the UE can deprioritize, in the one or more time gaps, at least one of UL communication or DL communication with the network entity. In one aspect, the communication and processing circuitry 1140 can be configured as a means to deprioritize UL and/or DL communication with the network entity. In one example, deprioritizing UL and/or DL communication can include deactivating communication with one or more SCell(s) in the AI/ML model time gap. In one example, the deactivated SCell(s) may not include an SCell associated with a PUCCH or an SCell with a PRACH configuration. In one example, deprioritizing UL and/or DL communication can include temporarily changing a BWP configuration to reduce processing and/or resource usage. For example, the UE can switch from an active BWP to a dormant BWP or a narrower BWP.

At block 1206, the UE can perform, in the one or more time gaps, one or more AI/ML model related processes. In one aspect, the AI/ML model circuitry 1142 can be configured as a means to perform one or more AI/ML model related processes. In one example, the UE can receive PDCCH/PDSCH transmissions and/or specific DL signals configured for AI/ML model related processes (e.g., compiling, training, compiling, verification, switching, etc.). In some aspects, the network entity (e.g., a base station, gNB, TRP) can configure and send PDCCH/PDSCH signals in a predetermined format that can be recognized and used by the UE to perform AI/ML model related functions in the AI/ML model time gap. In one example, the UE can receive non-cell-defining SSB (NCD-SSB), CSI-RS, etc. that can be used for AI/ML model related functions. These PDCCH/PDSCH and/or DL signals can be used in, for example, AI/ML model training (e.g., learning, parameters tuning) and/or model verification and testing.

In one configuration, the UE 1100 for wireless communication includes means for performing AI/ML model related processes and functions in configured AI/ML model time gaps. In one aspect, the aforementioned means may be the processor 1104 shown in FIG. 11 configured to perform the functions recited by the aforementioned means. In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable storage medium 1106, or any other suitable apparatus or means described in any one of the FIGS. 1, 2, 4, 6, and/or 10, and utilizing, for example, the processes and/or algorithms described herein in relation to FIGS. 7-10 and/or 12.

Figure 13:
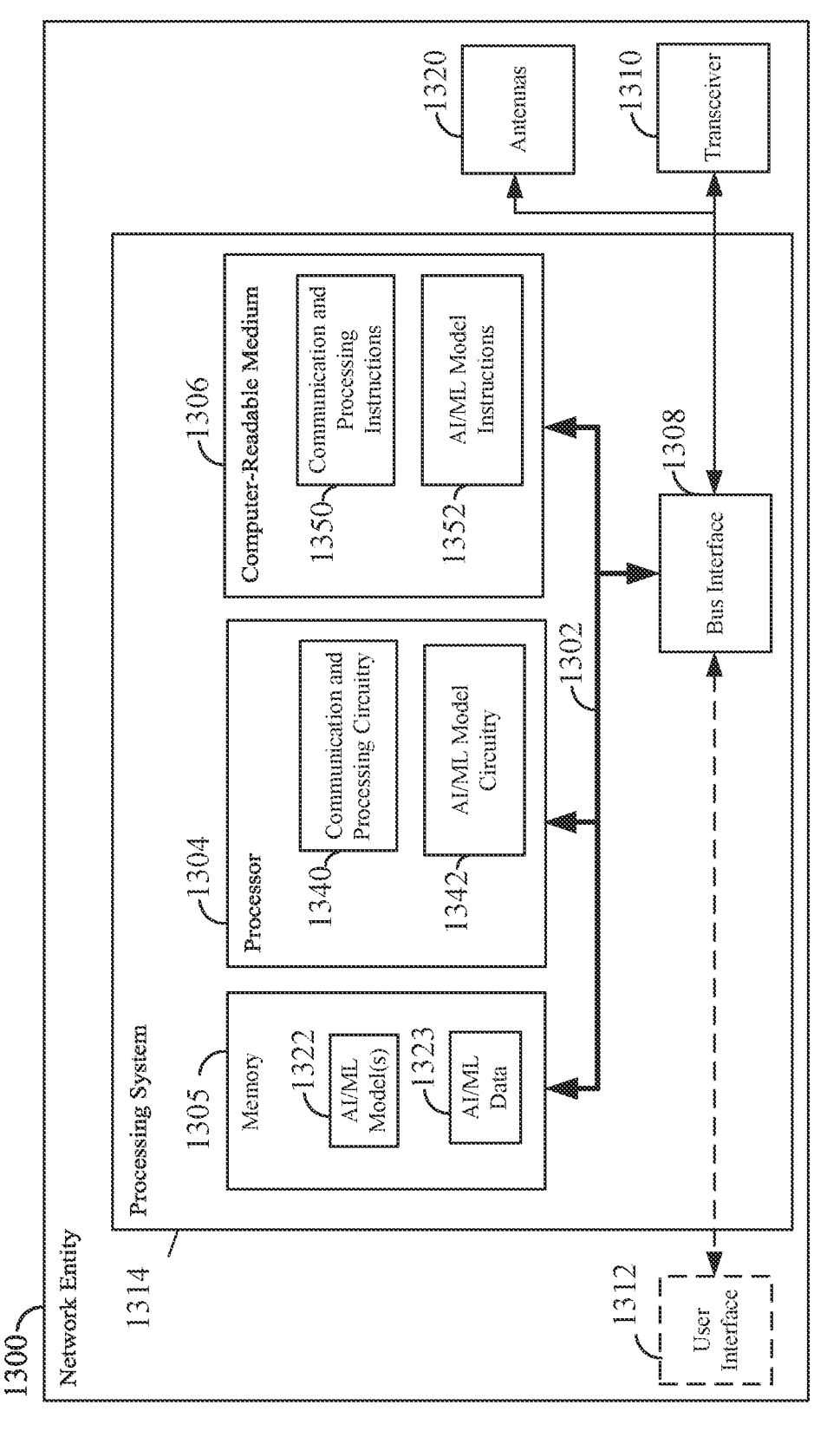
FIG. 13 is a block diagram illustrating an example of a hardware implementation for a network entity according to some aspects.

FIG. 13 is a diagram illustrating an example of a hardware implementation for an exemplary network entity 1300 employing a processing system 1314. In accordance with various aspects of the disclosure, an element, or any portion of an element, or any combination of elements may be implemented with a processing system 1314 that includes one or more processors 1304. For example, the network entity 1300 may be a network entity as illustrated in any one or more of FIGS. 1, 2, 4, 6, and/or 10.

The processing system 1314 may be substantially the same as the processing system 1114 illustrated in FIG. 11, including a bus interface 1308, a bus 1302, memory 1305, a processor 1304, and a computer-readable medium 1306. Furthermore, the network entity 1300 may include a user interface 1312 (optional) and a transceiver 1310 substantially similar to those described above in FIG. 11. The transceiver 1310 and an antenna array 1320 (e.g., one or more antennas) provide a communication interface or means for communicating with various other apparatus over a transmission medium. The processor 1304, as utilized in a network entity 1300, may be used to implement any one or more of the processes described herein and illustrated in FIGS. 7-10 and 14.

In some aspects of the disclosure, the processor 1304 may include circuitry configured for various functions, including, for example, AI/ML model related functions in wireless communication. For example, the circuitry may be configured to implement one or more of the functions described in relation to FIGS. 7-10 and 14.

In some aspects of the disclosure, the processor 1304 may include communication and processing circuitry 1340 configured for various functions, including for example communicating with a UE, another network entity (e.g., a base station, gNB, CU, DU, RU, TRP), or any other entity. In some examples, the communication and processing circuitry 1340 may include one or more hardware components that provide the physical structure that performs processes related to wireless communication (e.g., signal reception and/or signal transmission) and signal processing (e.g., processing a received signal and/or processing a signal for transmission). For example, the communication and processing circuitry 1340 may include one or more transmit/receive chains. In addition, the communication and processing circuitry 1340 may be configured to receive and process uplink traffic and uplink control messages (e.g., similar to uplink traffic 116 and uplink control 118 of FIG. 1), transmit and process downlink traffic and downlink control messages (e.g., similar to downlink traffic 112 and downlink control 114). The communication and processing circuitry 1340 may further be configured to execute communication and processing software 1350 stored on the computer-readable medium 1306 to implement one or more functions described herein.

In some implementations where the communication involves receiving information, the communication and processing circuitry 1340 may obtain information from a component of the network entity 1300 (e.g., from the transceiver 1310 that receives the information via radio frequency signaling or some other type of signaling suitable for the applicable communication medium), process (e.g., decode) the information, and output the processed information. For example, the communication and processing circuitry 1340 may output the information to another component of the processor 1304, to the memory 1305, or to the bus interface 1308. In some examples, the communication and processing circuitry 1340 may receive one or more of signals, messages, other information, or any combination thereof. In some examples, the communication and processing circuitry 1340 may receive information via one or more channels. In some examples, the communication and processing circuitry 1340 may include functionality for a means for receiving. In some examples, the communication and processing circuitry 1340 may include functionality for a means for processing, including a means for demodulating, a means for decoding, etc.

In some implementations where the communication involves sending (e.g., transmitting) information, the communication and processing circuitry 1340 may obtain information (e.g., from another component of the processor 1304, the memory 1305, or the bus interface 1308), process (e.g., modulate, encode, etc.) the information, and output the processed information. For example, the communication and processing circuitry 1340 may output the information to the transceiver 1310 (e.g., that transmits the information via radio frequency signaling or some other type of signaling suitable for the applicable communication medium). In some examples, the communication and processing circuitry 1340 may send one or more of signals, messages, other information, or any combination thereof. In some examples, the communication and processing circuitry 1340 may send information via one or more channels. In some examples, the communication and processing circuitry 1340 may include functionality for a means for sending (e.g., a means for transmitting). In some examples, the communication and processing circuitry 1340 may include functionality for a means for generating, including a means for modulating, a means for encoding, etc.

In some aspects, the communication and processing circuitry 1340 can be configured to deprioritize some communication or RAN functions and processes at a UE to increase resources and/or processing power available at the UE for performing one or more AI/ML model related functions as described herein. For example, AI/ML model related functions may include compiling, training, inference, validation, model testing, activation, deactivation, switching, etc. In one aspect, the communication and processing circuitry 1340 can deprioritize UL and/or DL communication at a UE, for example, by deactivating communication between the UE and one or more SCell(s) during one or more AI/ML model time gaps. In one aspect, the communication and processing circuitry 1340 can temporarily change a BWP configuration of a UE to reduce processing and/or resource usage of the UE. For example, the network entity can configure the UE to switch from an active BWP to a dormant BWP or a narrower BWP.

In some aspects of the disclosure, the processor 1304 may include AI/ML model circuitry 1342 that can be configured to perform various AI/ML model related functions in one or more AI/ML model time gaps. For example, the AI/ML model circuitry 1342 can be configured to perform model training, model inference, model validation, model testing, model activation, model deactivation, model switching, etc., of one or more AI/ML models in coordination with the UE. For example, one or more AI/ML models 1322 and associated AI/ML data 1323 may be stored in the memory 1305. The AI/ML model(s) may be downloaded from a network entity and/or predefined. The network entity can perform AI/ML model related functions ("model functions") in one or more time gaps in which the network can deprioritize some wireless communication functions at a UE. The AI/ML model circuitry 1342 may further be configured to execute AI/ML model software 1352 stored on the computer-readable medium 1306 to implement one or more functions described herein.

Figure 14:
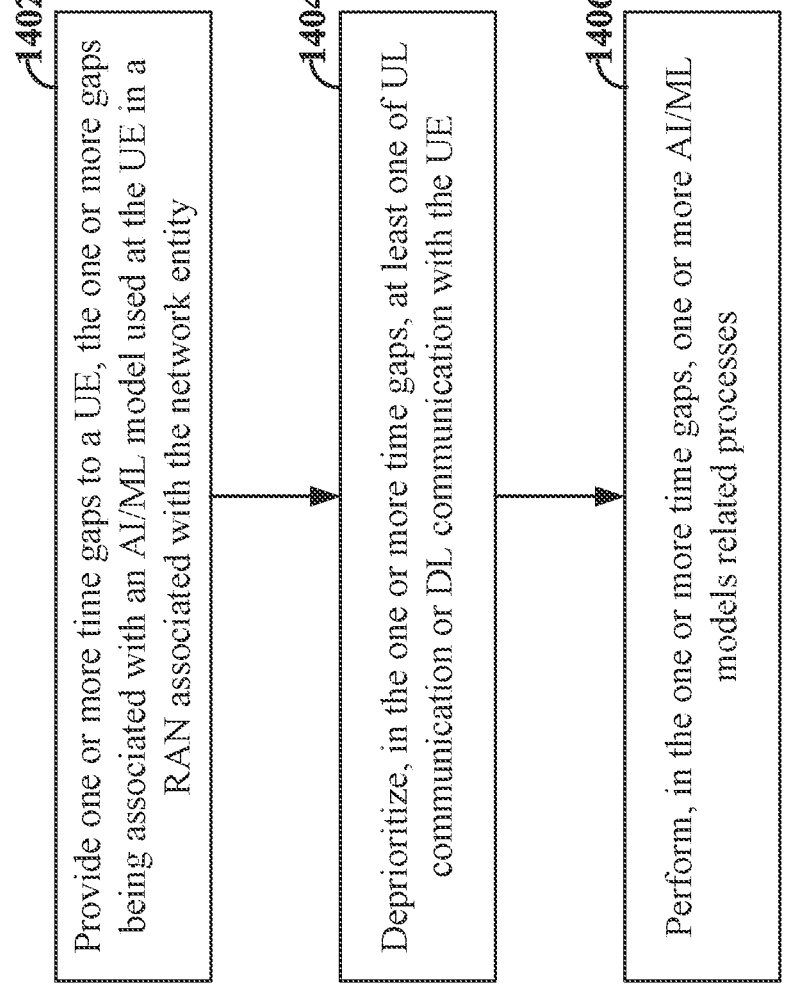
FIG. 14 is a flow chart illustrating an exemplary process for performing AI/ML model related functions at a network entity according to some aspects.

FIG. 14 is a flow chart illustrating an exemplary process 1400 for performing AI/ML model related functions at a network entity in accordance with some aspects of the present disclosure. As described below, some or all illustrated features may be omitted in a particular implementation within the scope of the present disclosure, and some illustrated features may not be required for implementation of all examples. In some examples, the process 1400 may be carried out by the network entity 1300 illustrated in FIG. 13. In some examples, the process 1400 may be carried out by any suitable apparatus or means for carrying out the functions or algorithm described below.

At block 1402, a network entity can provide one or more time gaps to a UE, the one or more time gaps being associated with an AI/ML model used at the UE in a RAN (e.g., RAN 200) associated the network entity. For example, the one or more time gaps may be the same as the time gaps 704 described above in relation to FIG. 7. In one aspect, the AI/ML model circuitry 1342 can be configured as a means to provide the one or more time gaps. The time gaps enable the UE to use an AI/ML model in a RAN associated with the network entity. In one example, the UE can use the AI/ML model for CSI feedback enhancement, for example, overhead reduction, improved accuracy, and prediction. In one example, the UE can use the AI/ML model for beam management, for example, beam prediction in time and/or spatial domain, overhead and latency reduction, beam selection accuracy improvement, etc. In one example, the UE can use the AI/ML model for positioning accuracy enhancements in various scenarios including, for example, conditions with significant non-line-of-sight conditions.

At block 1404, the network entity can deprioritize, in the one or more time gaps, at least one of UL communication or DL communication with the UE. In one aspect, the communication and processing circuitry 1340 can be configured as a means to deprioritize UL and/or DL communication with the UE. In one example, deprioritizing UL and/or DL communication can include deactivating communication between the UE and one or more SCell(s) in the AI/ML model time gap. In one example, the deactivated SCell(s) may not include an SCell associated with a PUCCH or an SCell with a PRACH configuration. In one example, deprioritizing UL and/or DL communication can include temporarily changing a BWP configuration of the UE to reduce processing and/or resource usage at the UE. For example, the network entity can configure the UE to switch from an active BWP to a dormant BWP or a narrower BWP.

At block 1406, the network entity can perform, in the one or more time gaps, one or more AI/ML models related processes. In one aspect, the AI/ML model circuitry 1342 can be configured as a means to perform one or more AI/ML models related processes. In one example, the network entity can transmit PDCCH/PDSCH transmissions and/or DL signals configured for AI/ML model related functions (e.g., training, compiling, verification, switching, etc.). In some aspects, the network entity (e.g., a base station, gNB, TRP) can configure and send PDCCH/PDSCH signals in a predetermined format that can be recognized and used by the UE to perform AI/ML model related functions (e.g., model training, testing, validation, etc.) in the time gap(s). In one example, the network entity can send DL reference signals (e.g., non-cell-defining SSB (NCD-SSB), CSI-RS, etc.) that can be used by the UE for AI/ML model related functions. These PDCCH/PDSCH and/or DL signals can be specifically configured for use in, for example, AI/ML model training (e.g., learning, parameters tuning) and/or model verification and testing, and the UE may not transmit normal (e.g., not related to AI/ML functions) feedback and/or report in response to these PDCCH/PDSCH and/or DL signals.

In one configuration, the network entity 1300 includes means for performing AI/ML related processes in configured time gaps as described above. In one aspect, the aforementioned means may be the processor 1304 shown in FIG. 13 configured to perform the functions recited by the aforementioned means. In another aspect, the aforementioned means may be a circuit or any apparatus configured to perform the functions recited by the aforementioned means. Of course, in the above examples, the circuitry included in the processor 1304 is merely provided as an example, and other means for carrying out the described functions may be included within various aspects of the present disclosure, including but not limited to the instructions stored in the computer-readable storage medium 1306, or any other suitable apparatus or means described in any one of the FIGS. 1, 2, 4, 6, and/or 10, and utilizing, for example, the processes and/or algorithms described herein in relation to FIGS. 7-10 and/or 14.

In a first aspect, a method of wireless communication at a user equipment (UE) is provided. The method comprises: providing one or more time gaps associated an artificial intelligence and machine learning (AI/ML) model used for communication with a network entity; deprioritizing, in the one or more time gaps, at least one of uplink (UL) communication or downlink (DL) communication with the network entity; and performing, in the one or more time gaps, one or more AI/ML model related processes.

In a second aspect, alone or in combination with the first aspect, wherein the one or more AI/ML models related processes comprise at least one of model training, model inference, model validation, model testing, model activation, model deactivation, or model switching.

In a third aspect, alone or in combination with the first aspect, the method further comprises at least one of: performing channel measurement and reporting using the AI/ML model; performing beam management using the AI/ML model; or performing positioning using the AI/ML model.

In a fourth aspect, alone or in combination with any of the first to third aspects, wherein the deprioritizing comprises at least one of: deactivating data transmission with one or more secondary serving cells (SCells); or switching an active bandwidth part (BWP) to a dormant BWP or a narrower BWP.

In a fifth aspect, alone or in combination with any of the first to third aspects, wherein the one or more AI/ML models related processes comprise training the AI/ML model based on at least one of a physical downlink control channel (PDCCH) transmission, a physical downlink shared channel (PDSCH) transmission, or a downlink reference signal; refraining from transmitting an acknowledgement of the PDCCH transmission or the PDSCH transmission; refraining from transmitting a measurement report based on the downlink reference signal; or transmitting a report indicating at least one of a selection of an AI/ML model or a reliability of an AI/ML model.

In a sixth aspect, alone or in combination with any of the first to third aspects, wherein the one or more time gaps are associated with a subset of currently configured carriers or bandwidth parts of the UE.

In a seventh aspect, alone or in combination with any of the first to third aspects, the method further comprises at least one of receiving a query of the one or more time gaps or sending a request of the one or more time gaps.

In an eighth aspect, alone or in combination with any of the first to third aspects, the method further comprises: receiving a radio resource control (RRC) configuration associated with the one or more time gaps, wherein the RRC configuration comprises at least one of DRX configuration, MIMO configuration, or measurement and report configuration.

In a ninth aspect, a user equipment (UE) for wireless communication is provided. The UE comprises a communication interface, a memory stored with executable code, and a processor coupled to the communication interface and the memory. The processor is configured by the executable code to provide one or more time gaps associated an artificial intelligence and machine learning (AI/ML) model used for communication with a network entity using the communication interface. The processor is further configured to deprioritize, in the one or more time gaps, at least one of uplink (UL) communication or downlink (DL) communication with the network entity. The processor is further configured to perform, in the one or more time gaps, one or more AI/ML model related processes.

In a tenth aspect, alone or in combination with the ninth aspect, wherein the one or more AI/ML models related processes comprise at least one of model training, model inference, model validation, model testing, model activation, model deactivation, or model switching.

In an eleventh aspect, alone or in combination with the ninth aspect, wherein the processor is further configured to, at least one of: perform channel measurement and reporting using the AI/ML model; perform beam management using the AI/ML model; or perform positioning using the AI/ML model.

In a twelfth aspect, alone or in combination with any of the ninth to eleventh aspects, wherein to deprioritize the at least one of UL communication or DL communication, the processor is further configured to at least one of: deactivate data transmission with one or more secondary serving cells (SCells); or switch an active bandwidth part (BWP) to a dormant BWP or a narrower BWP.

In a thirteenth aspect, alone or in combination with any of the ninth to eleventh aspects, wherein the one or more AI/ML models related processes comprise, at least one of training the AI/ML model based on at least one of a physical downlink control channel (PDCCH) transmission, a physical downlink shared channel (PDSCH) transmission, or a downlink reference signal; refraining from transmitting an acknowledgement of the PDCCH transmission or the PDSCH transmission; refraining from transmitting a measurement report based on the downlink reference signal; or transmitting a report indicating at least one of a selection of an AI/ML model or a reliability of an AI/ML model.

In a fourteenth aspect, alone or in combination with any of the ninth to eleventh aspects, wherein the one or more time gaps are associated with a subset of currently configured carriers or bandwidth parts of the UE.

In a fifteenth aspect, alone or in combination with any of the ninth to eleventh aspects, wherein the processor is further configured to, at least one of: receive a query of the one or more time gaps; or send a request of the one or more time gaps.

In a sixteenth aspect, alone or in combination with any of the ninth to eleventh aspects, wherein the processor is further configured to: receive a radio resource control (RRC) configuration associated with the one or more time gaps, wherein the RRC configuration comprises at least one of DRX configuration, MIMO configuration, or measurement and report configuration.

In a seventeenth aspect, a method of wireless communication at a network entity is provided. The method includes providing one or more time gaps to a user equipment (UE), the one or more time gaps being associated with an artificial intelligence and machine learning (AI/ML) model at the UE in a radio access network associated with the network entity. The method further includes deprioritizing, in the one or more time gaps, at least one of uplink (UL) communication or DL communication with the UE. The method further includes performing, in the one or more time gaps, one or more AI/ML models related processes.

In an eighteenth aspect, alone or in combination with the seventeenth aspect, wherein the one or more AI/ML models related processes comprise at least one of model training, model inference, model validation, model testing, model activation, model deactivation, or model switching.

In a nineteenth aspect, alone or in combination with the seventeenth aspect, wherein the deprioritizing comprises at least one of: deactivating data transmission with the UE via one or more secondary serving cells (SCells); or switching an active bandwidth part (BWP) of the UE to a dormant BWP or a narrower BWP.

In a twentieth aspect, alone or in combination with any of the seventeenth to nineteenth aspects, wherein the one or more AI/ML models related processes comprise, at least one of: training the AI/ML model based on at least one of a physical downlink control channel (PDCCH) transmission, a physical downlink shared channel (PDSCH) transmission, or a downlink reference signal; disregarding, from the UE, an acknowledgement of the PDCCH transmission or the PDSCH transmission; disregarding, from the UE, a measurement report based on the downlink reference signal; or receiving a report indicating at least one of a selection of an AI/ML model or a reliability of an AI/ML model.

In a twenty-first aspect, alone or in combination with any of the seventeenth to nineteenth aspects, wherein the one or more time gaps are associated with a subset of currently configured carriers or bandwidth parts of the UE.

In a twenty-second aspect, alone or in combination with any of the seventeenth to nineteenth aspects, the method further comprises: transmitting a query of the one or more time gaps; or receiving a request of the one or more time gaps.

In a twenty-third aspect, alone or in combination with any of the seventeenth to nineteenth aspects, the method further comprises: transmitting a radio resource control (RRC) configuration associated with the one or more time gaps, wherein the RRC configuration comprises at least one of DRX configuration, MIMO configuration, or measurement and report configuration.

In a twenty-fourth aspect, a network entity for wireless communication is provided. The network entity comprises a memory stored with executable code and a processor coupled to the memory. The processor is configured by the executable code to provide one or more time gaps to a user equipment (UE), the one or more time gaps being associated with an artificial intelligence and machine learning (AI/ML) model at the UE in a radio access network associated with the network entity. The processor is further configured to deprioritize, in the one or more time gaps, at least one of uplink (UL) communication or downlink (DL) communication with the UE. The processor is further configured to perform, in the one or more time gaps, one or more AI/ML models related processes.

In a twenty-fifth aspect, alone or in combination with the twenty-fourth aspect, wherein the one or more AI/ML models related processes comprise at least one of model training, model inference, model validation, model testing, model activation, model deactivation, or model switching.

In a twenty-sixth aspect, alone or in combination with the twenty-fourth aspect, wherein to deprioritize the at least one of UL communication or the DL communication, the processor is further configured to, at least one of: deactivate data transmission with the UE via one or more secondary serving cells (SCells); or switch an active bandwidth part (BWP) of the UE to a dormant BWP or a narrower BWP.

In a twenty-seventh aspect, alone or in combination with any of the twenty-fourth to twenty-sixth aspects, wherein the one or more AI/ML models related processes comprise, at least one of training the AI/ML model based on at least one of a physical downlink control channel (PDCCH) transmission, a physical downlink shared channel (PDSCH) transmission, or a downlink reference signal; disregarding, from the UE, an acknowledgement of the PDCCH transmission or the PDSCH transmission; disregarding, from the UE, a measurement report based on the downlink reference signal; or receiving a report indicating at least one of a selection of an AI/ML model or a reliability of an AI/ML model.

In a twenty-eighth aspect, alone or in combination with any of the twenty-fourth to twenty-sixth aspects, wherein the one or more time gaps are associated with a subset of currently configured carriers or bandwidth parts of the UE.

In a twenty-ninth aspect, alone or in combination with any of the twenty-fourth to twenty-sixth aspects, wherein the processor is further configured to: transmit a query of the one or more time gaps; or receive a request of the one or more time gaps.

In a thirtieth aspect, alone or in combination with any of the twenty-fourth to twenty-sixth aspects, wherein the processor is further configured to: transmit a radio resource control (RRC) configuration associated with the one or more time gaps, wherein the RRC configuration comprises at least one of DRX configuration, MIMO configuration, or measurement and report configuration.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-14 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a user equipment (UE), comprising:

providing one or more time gaps configured to enable one or more processes related to an artificial intelligence and machine learning (AI/ML) model to be performed by the UE, the AI/ML model configured to operate with an air interface between a network entity and the UE;

increasing available resources for performing the one or more processes related to the AI/ML model by deprioritizing, in the one or more time gaps, at least one of uplink (UL) communication or downlink (DL) communication with the network entity, wherein the deprioritizing comprises at least one of:

deactivating, in the one or more time gaps, data transmission with one or more secondary serving cells (SCells); or switching, in the one or more time gaps, an active bandwidth part (BWP) to a dormant BWP or a narrower BWP to reduce at least one of processing or resource usage of the UE; and performing, in the one or more time gaps, the one or more processes comprising at least one of model training, model inference, model validation, model testing, model compiling, model activation, model deactivation, or model switching.

2. The method of claim 1, further comprising at least one of:

performing channel measurement and reporting using the AI/ML model;

performing beam management using the AI/ML model; or performing positioning using the AI/ML model.

3. The method of claim 1, wherein the one or more processes comprise:

training the AI/ML model based on at least one of a physical downlink control channel (PDCCH) transmission, a physical downlink shared channel (PDSCH) transmission, or a downlink reference signal;

refraining from transmitting an acknowledgement of the PDCCH transmission or the PDSCH transmission that is configured for the one or more processes related to the AI/ML model;

refraining from transmitting a measurement report based on the downlink reference signal that is configured for the one or more processes related to the AI/ML model; or transmitting a report indicating at least one of a selection of an AI/ML model or a reliability of an AI/ML model.

4. The method of claim 1, wherein the one or more time gaps are associated with a subset of currently configured carriers or bandwidth parts of the UE.

5. The method of claim 1, further comprising at least one of:

receiving a query of the one or more time gaps; or sending a request of the one or more time gaps.

6. The method of claim 1, further comprising:

receiving a radio resource control (RRC) configuration associated with the one or more time gaps, wherein the RRC configuration comprises at least one of DRX configuration, MIMO configuration, or measurement and report configuration.

7. A user equipment (UE) for wireless communication, comprising:

one or more memories stored with executable code; and one or more processors coupled to the one or more memories, wherein the one or more processors are configured by the executable code to cause the UE to:

provide one or more time gaps configured to enable one or more processes related to an artificial intelligence and machine learning (AI/ML) model to be performed by the UE, the AI/ML model configured to operate with an air interface between a network entity and the UE;

increase available resources for performing the one or more processes related to the AI/ML model by deprioritizing, in the one or more time gaps, at least one of uplink (UL) communication or downlink (DL) communication with the network entity, wherein the deprioritizing comprises at least one of:

deactivating, in the one or more time gaps, data transmission with one or more secondary serving cells (SCells); or switching, in the one or more time gaps, an active bandwidth part (BWP) to a dormant BWP or a narrower BWP to reduce at least one of processing or resource usage of the UE; and perform, in the one or more time gaps, the one or more processes comprising at least one of model training, model inference, model validation, model testing, model compiling, model activation, model deactivation, or model switching.

8. The UE of claim 7, wherein the one or more processors are further configured to cause the UE to, at least one of:

perform channel measurement and reporting using the AI/ML model;

perform beam management using the AI/ML model; or perform positioning using the AI/ML model.

9. The UE of claim 7, wherein to deprioritize the at least one of UL communication or DL communication, the one or more processors are further configured to cause the UE to, at least one of:

deactivate, in the one or more time gaps, data transmission with one or more secondary serving cells (SCells); or switch, in the one or more time gaps, an active bandwidth part (BWP) to a dormant BWP or a narrower BWP to reduce at least one of processing or resource usage of the UE.

10. The UE of claim 7, wherein the one or more processes comprise, at least one of:

training the AI/ML model based on at least one of a physical downlink control channel (PDCCH) transmission, a physical downlink shared channel (PDSCH) transmission, or a downlink reference signal;

refraining from transmitting an acknowledgement of the PDCCH transmission or the PDSCH transmission that is configured for the one or more processes related to the AI/ML model;

refraining from transmitting a measurement report based on the downlink reference signal that is configured for the one or more processes related to the AI/ML model; or transmitting a report indicating at least one of a selection of an AI/ML model or a reliability of an AI/ML model.

11. The UE of claim 7, wherein the one or more time gaps are associated with a subset of currently configured carriers or bandwidth parts of the UE.

12. The UE of claim 7, wherein the one or more processors are further configured to cause the UE to, at least one of:

receive a query of the one or more time gaps; or send a request of the one or more time gaps.

13. The UE of claim 7, wherein the one or more processors are further configured to cause the UE to:

receive a radio resource control (RRC) configuration associated with the one or more time gaps, wherein the RRC configuration comprises at least one of DRX configuration, MIMO configuration, or measurement and report configuration.

14. A method of wireless communication at a network entity, comprising:

providing one or more time gaps to a user equipment (UE), the one or more time gaps being configured to enable one or more processes related to an artificial intelligence and machine learning (AI/ML) model to be performed at the UE in a radio access network associated with the network entity, the AI/ML model configured to operate with an air interface between the network entity and the UE;

increasing available resources for performing the one or more processes related to the AI/ML model by deprioritizing, in the one or more time gaps, at least one of uplink (UL) communication or DL communication with the UE, wherein the deprioritizing comprises at least one of:

deactivating data transmission with the UE via one or more secondary serving cells (SCells); or switching an active bandwidth part (BWP) of the UE to a dormant BWP or a narrower BWP to reduce at least one of processing or resource usage of the UE; and performing, in the one or more time gaps, the one or more processes comprising at least one of model training, model inference, model validation, model testing, model compiling, model activation, model deactivation, or model switching.

15. The method of claim 14, wherein the one or more processes comprise, at least one of:

training the AI/ML model based on at least one of a physical downlink control channel (PDCCH) transmission, a physical downlink shared channel (PDSCH) transmission, or a downlink reference signal;

disregarding, from the UE, an acknowledgement of the PDCCH transmission or the PDSCH transmission related to the training of the AI/ML model;

disregarding, from the UE, a measurement report based on the downlink reference signal related to the training of the AI/ML model; or receiving a report indicating at least one of a selection of an AI/ML model or a reliability of an AI/ML model.

16. The method of claim 14, wherein the one or more time gaps are associated with a subset of currently configured carriers or bandwidth parts of the UE.

17. The method of claim 14, further comprising:

transmitting a query of the one or more time gaps; or receiving a request of the one or more time gaps.

18. The method of claim 14, further comprising:

transmitting a radio resource control (RRC) configuration associated with the one or more time gaps, wherein the RRC configuration comprises at least one of DRX configuration, MIMO configuration, or measurement and report configuration.

19. A network entity for wireless communication, comprising:

one or more memories stored with executable code; and one or more processors coupled to the memory, wherein the one or more processors are configured by the executable code to cause the network entity to:

provide one or more time gaps to a user equipment (UE), the one or more time gaps being configured to enable one or more processed related to an artificial intelligence and machine learning (AI/ML) model to be performed at the UE in a radio access network associated with the network entity, the AI/ML model configured to operate with an air interface between the network entity and the UE;

increase available resources for performing the one or more processes related to the AI/ML model by deprioritizing, in the one or more time gaps, at least one of uplink (UL) communication or downlink (DL) communication with the UE, wherein to deprioritize the at least one of UL communication or the DL communication, the one or more processors are further configured to cause the network entity to, at least one of:

deactivate data transmission with the UE via one or more secondary serving cells (SCells); or switch an active bandwidth part (BWP) of the UE to a dormant BWP or a narrower BWP to reduce at least one of processing or resource usage of the UE; and perform, in the one or more time gaps, the one or more processes comprising at least one of model training, model inference, model validation, model testing, model compiling, model activation, model deactivation, or model switching.

20. The network entity of claim 19, wherein the one or more processes comprise, at least one of:

training the AI/ML model based on at least one of a physical downlink control channel (PDCCH) transmission, a physical downlink shared channel (PDSCH) transmission, or a downlink reference signal;

disregarding, from the UE, an acknowledgement of the PDCCH transmission or the PDSCH transmission related to the training of the AI/ML model;

disregarding, from the UE, a measurement report based on the downlink reference signal related to the training of the AI/ML model; or receiving a report indicating at least one of a selection of an AI/ML model or a reliability of an AI/ML model.

21. The network entity of claim 19, wherein the one or more time gaps are associated with a subset of currently configured carriers or bandwidth parts of the UE.

22. The network entity of claim 19, wherein the one or more processors are further configured to cause the network entity to:

transmit a query of the one or more time gaps; or receive a request of the one or more time gaps.

23. The network entity of claim 19, wherein the one or more processors are further configured to cause the network entity to:

transmit a radio resource control (RRC) configuration associated with the one or more time gaps, wherein the RRC configuration comprises at least one of DRX configuration, MIMO configuration, or measurement and report configuration.

* * * * *